United States Patent
Kurosawa et al.

(10) Patent No.: US 7,658,550 B2
(45) Date of Patent: Feb. 9, 2010

(54) OPTICAL FIBER, OPTICAL FIBER CONNECTING METHOD, AND OPTICAL CONNECTOR

(75) Inventors: Yoshinori Kurosawa, Tokyo (JP); Bing Yao, Tokyo (JP); Kazumasa Ohsono, Tokyo (JP); Masao Tachikura, Tokyo (JP); Hisanori Nakai, Tokyo (JP); Toshio Kurashima, Tokyo (JP); Eiji Araki, Tokyo (JP); Katumi Hiramatu, Tokyo (JP)

(73) Assignees: Hitachi Cable Ltd., Tokyo (JP); Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 12/073,411

(22) Filed: Mar. 5, 2008

(65) Prior Publication Data

US 2008/0253726 A1 Oct. 16, 2008

Related U.S. Application Data

(62) Division of application No. 10/551,949, filed on Oct. 6, 2005, now Pat. No. 7,376,315.

(51) Int. Cl.
*G02B 6/36* (2006.01)
(52) U.S. Cl. .............................. 385/77; 385/55; 385/80
(58) Field of Classification Search .................. 385/55, 385/80, 123
See application file for complete search history.

(56) References Cited

U.S. PATENT DOCUMENTS 6,334,019 B1   12/2001   Birks et al.

| | | |
|---|---|---|
| 2004/0151450 A1 | 8/2004 | Wadsworth et al. |
| 2004/0247271 A1* | 12/2004 | Skovgaard et al. .......... 385/125 |
| 2005/0018986 A1 | 1/2005 | Argyros et al. |
| 2005/0238308 A1 | 10/2005 | Hasagawa et al. |
| 2006/0008218 A1 | 1/2006 | Knight et al. |
| 2007/0110377 A1 | 5/2007 | Sanghera et al. |

FOREIGN PATENT DOCUMENTS

| EP | 1 233 290 A2 | 8/2002 |
|---|---|---|
| JP | 6-73359 | 3/1994 |
| JP | 2002-506533 | 2/2002 |
| JP | 2002-236234 | 8/2002 |
| JP | 2002-243972 | 8/2002 |
| JP | 2003-167145 | 6/2003 |
| WO | WO 99/00685 | 1/1999 |

OTHER PUBLICATIONS

Chinese Office Action dated Feb. 16, 2007 with English translation.

* cited by examiner

*Primary Examiner*—Frank G Font
*Assistant Examiner*—Eric Wong
(74) *Attorney, Agent, or Firm*—McGinn IP Law Group, PLLC

(57) ABSTRACT

An optical fiber which, at an optical fiber connecting end having a plurality of voids around the periphery of a core, has a light-permeable substance, such as a resin or glass whose refractive index is lower than that of quartz type substances, filled in the voids adjacent to the connecting end. An optical fiber connecting section where an optical fiber having a plurality of voids in a clad around the periphery of a core is connected to another optical fiber, wherein the optical fiber is connected end-to-end to aforesaid another optical fiber through a refractive index matching agent whose refractive index at the minimum temperature in actual use is lower than that of the core.

20 Claims, 25 Drawing Sheets

US 7,658,550 B2

OPTICAL FIBER, OPTICAL FIBER CONNECTING METHOD, AND OPTICAL CONNECTOR

RELATED APPLICATIONS

The present Application is a Divisional Application of U.S. patent application Ser. No. 10/551,949 filed on Oct. 6, 2005 now U.S. Pat. No. 7,376,315.

The present application is based on Japanese patent application Nos. 2003-189724, 2003-189655, 2003-194476, 2003-189726 and 2003-346905, the entire contents of which are incorporated herein by reference.

TECHNICAL FIELD

The present invention relates to an optical fiber having a plurality of air holes around a core and particularly, to an optical connector and a method for connecting a photonic crystal fiber and a single mode fiber whose mode field diameter is larger than that of the photonic crystal fiber.

Further, the present invention relates to a structure and method for sealing an end of an optical fiber having a high refractive index core and a low refractive index cladding formed therearound, the cladding having a plurality of air holes extending in the axial direction of the fiber.

Further, the present invention relates to an optical fiber having a high refractive index core and a low refractive index cladding formed therearound, the cladding having a plurality of air holes extending in the axial direction of the fiber, and to a connector for the optical fiber.

Further, the present invention relates to an optical fiber connection portion for connecting an optical fiber having a plurality of air holes in a cladding around a core to another optical fiber, and to an optical fiber splicer having this connection portion housed in a chassis.

BACKGROUND ART

Conventional optical fibers generally used comprise two layers: a core for light confinement, and a cladding circumferentially covering the core, where the cladding has a slightly lower refractive index than that of the core, and the core and cladding are both formed of quartz material. Because the refractive index of the core is slightly higher than that of the cladding, the two-layered fibers allow light to be confined in the core by the refractive index difference, and to thereby propagate in the optical fibers.

Regarding methods for connecting single mode fibers to each other, there are connection methods by a connector and a mechanical splice. The connector connection method mounts optical fibers to respective optical connectors in such a manner as to be easily detachable. The mechanical splice connection method joins the end faces of optical fibers to each other in a V-groove or the like provided in the mechanical splice in such a manner as to securely hold both of the joined optical fibers. The connection techniques for typical single mode fibers have been fully developed.

Photonic crystal fibers (PCFs) have recently been remarkable.

PCFs are optical fibers having a photonic crystal structure in its cladding, i.e., a periodic refractive index structure. Light can be localized by reducing the periodic structure up to the order of light wavelength or several times the light wavelength to introduce a defect and local nonuniformity into a crystal.

Referring to FIG. 5, there is explained a cross-sectional structure of this PCF.

A PCF 41 is formed of only a cladding 42 whose refractive index is all the same in the fiber, from the center of which are arranged a multiplicity of cylindrical air holes 43 in a hexagonal lattice form, where the cylindrical air holes 43 extend along the entire length of the fiber 41. The member having a light confinement function, which corresponds to a conventional core, is a crystal defect portion 44 at the center of the fiber 41.

Specifically, in a pure quartz fiber with a cladding diameter $\phi$ of 125 μm, the cylindrical air holes 43 with a diameter $\phi$ of 3 μm are arranged in the cladding 42 from the center periodically in a hexagonal lattice form (4 periodic structure), and no air holes are formed at the center (crystal defect), which serves as the core 44 for light confinement.

A technique is essential for connecting a PCF which has a large light confinement effect, and a single mode fiber (SMF) now used in long-distance large-capacity communications.

Japanese patent application laid-open No. 2002-243972 discloses a method for connecting a PCF and an SMF, in which a PCF end to be connected is heated for mounting to a ferrule.

However, the above connection method can be applied to only a PCF whose core is formed of a higher-refractive-index medium than that of its cladding. In other words, the above connection method cannot be applied to a fiber structure whose core and cladding have the same refractive index, and in which a photonic crystal structure with cylindrical air holes allows light to be confined in the core by equivalently providing a refractive index difference between the core and cladding. This is because heating the PCF end to be connected causes fusion bonding of the wall of the cylindrical air holes so that the cylindrical air holes vanish, which therefore results in no core. In this case, the cores of the PCF and the SMF to be connected thereto are connected to each other via a portion in which no core is present, which therefore results in an increase in connection loss.

Accordingly, it is a first object of the present invention to provide a PCF-type optical fiber, a method for connecting the PCF-type optical fiber and an SMF, and an optical connector, which are capable of suppressing an increase in connection loss.

In Holey fibers (HFs) which are a kind of PCFs, on the other hand, air holes are formed in a cladding around a core of a conventional optical fiber, to reduce the effective refractive index of the cladding to increase the relative refractive index difference between the core and cladding, thereby allowing greatly enhancing its bend loss property, compared to the conventional optical fiber. (See, "A study on practical use of Holey fibers", Yao-B, et al., Shingaku Giho, Institute of Electronics, Information and Communication Engineers, Vol. 102, No. 581, pp. 47-50; "Trend of the development of photonic crystal fibers and Holey fibers", Takemi Hasegawa; Monthly periodical "Optoelectronics", Optoelectronics Inc., No. 7, pp. 203-208 (2001)).

In such an HF with a plurality of air holes extending in the axial direction of the fiber in its cladding, if these air holes are open-ended, moistures invade thereinto, which would cause a degradation in mechanical strength, and a variation in optical properties due to dew condensation caused by temperature variations.

As methods for obviating such problems, Japanese patent application laid-open No. 2002-323625 discloses methods for sealing air holes of an optical fiber, (1) by using a fusion splicer (apparatus for joining optical fibers by fusing the optical fibers by gas discharge) to heat the end face of the optical fiber to soften its cladding to collapse the air holes; (2) by inserting a hardened substance into hollow portions; and (3) by fitting a lid onto hollow portions from outside.

However, in the (1) method, because cladding material around the air holes is fused to fill and thereby seal the air holes but the amount of the material does not change, the diameter (cladding diameter) of the optical fiber becomes small. For instance, in the case of a cladding diameter of 125 µm and 4 air holes with a diameter of 10 µm, with simple calculations, the cladding diameter is reduced by approximately 2 µm to the order of 123 µm. This amount becomes larger as it is more different from the inside diameter of a standard ferrule in typical connector connection. Also, when the heating source is a fusion splicer, because of a high temperature of its discharge gas and also effects of evaporation in the cladding surface, the actual dimensions are still smaller, and in the case of a larger total cross-section of the air holes, the dimensions are more remarkably reduced. This causes a time-consuming choice of a ferrule matching a cladding diameter after sealing. In addition, because the discharge gas heats the optical fiber end face and cladding surface therearound together, which makes an edge of the optical fiber end round, there is the drawback that the dimensions around the end face tend to vary.

In the (2) method, because hardening of the hardened substance is accompanied by volume contraction, foams occur in hardened portion. The space inside the foams has a refractive index of approximately 1, which therefore makes the refractive index difference between the hardened substance and the foams very large, and if portion with such a large refractive index variation is adjacent to the core, it affects waveguide structure of the optical fiber, which would cause a large loss.

In the (3) method, there is the drawback of notable variations in the dimensions around the end face.

Accordingly, it is a second object of the present invention to provide a structure and method for sealing an end of an optical fiber, which are capable of maintaining dimensions around the end face, with a cladding diameter maintained accurately, without affecting waveguide structure of the optical fiber.

In the above-described Holey fiber, on the other hand, during connector processing, direct grinding of an end face would cause ground powder and abrasive to invade into air holes of the fiber and remain therein even after connector processing. When the connector is repeatedly attached and detached, the remaining ground powder and abrasive can be released from the air holes in such a manner as to adhere to the ground surface of the fiber. Connector connection with ground powder and abrasive adhering to the ground surface of the fiber prevents close contact of the connector end faces, which would cause not only an increase in loss, but, in the worst case, also concern for damaging the ground surface so that even if the end face is cleaned, the increased loss is not recovered.

Accordingly, it is a third object of the present invention to provide an optical fiber and an optical fiber connector, which are capable of low-loss connection with no remaining ground powder and abrasive caused in air holes of a fiber end face during grinding, and which are also excellent in long-term reliability.

A Holey fiber (HF) is explained in detail again. FIG. 17 illustrates an HF 361 comprising a core 362 made of germanium-added pure quartz, a cladding 363 of pure quartz formed therearound, and a plurality of air holes 364 (6 air holes in FIG. 17) extending axially so as to surround the core 362 in the cladding 363. Although not illustrated in detail, the HF 361 is used as an optical fiber core wire with a coating layer formed around the cladding 363.

The core 362 is the same as a core of typical single mode fibers (SMFs). The core diameter φ is 9 µm, the cladding diameter φ 125 µm, and the air hole 364 diameter φ 8 µm. The refractive index of the core 362 is 1.463, and the refractive index of the cladding 363 is 1.458, and the relative refractive index difference of the core 362 to the cladding 363 is approximately 0.35% which is the same as that of typical SMFs.

The features of the HF 361 are as follows: The refractive index of the air holes 364 is 1, and the effective relative refractive index difference is approximately 32% which is much larger than that of typical SMFs, which therefore has a large light confinement effect to the core 362. For this reason, the HF 361 has an extremely small loss caused when the HF 361 is bent, for example.

FIG. 18 illustrates a conventional optical fiber connection portion 370 in which a coating-removed and end-treated end face 361a of the HF 361 is joined to a coating-removed and end-treated end face 371a of the SMF 371 via a gelled refractive index matching agent r7. The SMF 371 comprises a core 372 with the same refractive index and diameter as those of the core 362 of the HF 361 and a cladding 373 with the same refractive index and diameter as those of the cladding 363 of the HF 361.

Because an air layer can be formed between respective end faces 361a and 372a of the HF 361 and the SMF 371 due to error in end treatment after end-to-end joining, the refractive index matching agent r7 is used to reduce a Fresnel reflection loss due to a refractive index difference caused by this air layer.

The refractive index matching agent r7 has a temperature characteristic which obeys a temperature characteristic line 381 of FIG. 19, for example. In order to make a Fresnel reflection loss as small as possible, the refractive index of the refractive index matching agent r7 is around 1.463 at around room temperature, which is substantially equal to the refractive index of the respective cores 362 and 372 of the HF 361 and the SMF 371 explained in FIG. 18. Further, refractive indices vary according to wavelengths, which, unless otherwise noted herein, are measured values indicated by $n_D{}^{25}$, i.e., measured values at 25° C. using Na D-line (wavelength 587.56 nm).

As one example of conventional optical fiber splicers with the optical fiber connection portion 370 housed therein, there is a single-core mechanical splice 391 as illustrated in FIG. 20 (see, e.g., Japanese patent application laid-open Nos. 2000-241660, and 2002-236234). The mechanical splice 391 comprises a V-groove substrate 392 having a V-groove for end-to-end joining, supporting, positioning and core alignment of optical fibers facing each other; a lid 393 for being superimposed on the substrate 392 to hold the optical fibers inserted into the V-groove; and sandwiching members 394 for sandwiching the substrate 392 and the lid 393 therebetween.

In superimposed portions of the substrate 392 and the lid 393, wedge-inserting portions 395 are formed at their side, and guild holes 396 are formed at both their ends respectively. A chassis 397 comprises the substrate 392 and the lid 393.

In the mechanical splice 391, an end-to-end joining position of the optical fibers (an inner-surface middle portion of the substrate 392 and the lid 393) is beforehand filled with a refractive index matching agent r7 explained in FIGS. 18 and 19. Wedges are respectively inserted into the wedge-inserting portions 395 so as to form a gap between the substrate 392 and the lid 393, to insert the end-treated HF 361 and SMF 371 from the guild holes 396 into this gap for end-to-end joining thereof in the V-groove, followed by removal of the wedges to hold, fix and connect the HF 361 and SMF 371 by means of the substrate 392 and the lid 393.

This allows the optical fiber connection portion 370 explained in FIG. 18 to be housed in the chassis 397 of the mechanical splice 391, thereby joining end-to-end the HF 361 and SMF 371.

In this manner, also in the case of use of the mechanical splice 391, since the cladding diameter of the HF 361 is equal to the cladding diameter of the SMF 371, the HF 361 and SMF 371 can be connected totally in the same way as the case of connecting typical SMFs to each other.

In the conventional optical fiber connection portion 370, however, the end-to-end joining of the HF 361 to the SMF 371 via the refractive index matching agent r7 causes a capillary phenomenon whereby the refractive index matching agent r7 penetrates into each air hole 364 of the HF 361 up to the depth of a few hundreds μm from the end face 361a. The refractive index of the cladding 363 is 1.458, and the refractive index of each air hole 364 is 1, but the refractive index matching agent r7 whose refractive index is 1.463 at room temperature penetrating into each air hole 364 would form 6 quasi-cores around the original central core 362.

For this reason, the effective core diameter of the HF 361 after connection, in other words, the diameter for allowing light propagation (the mode field diameter: MFD) becomes virtually larger than 9 μm before connection. Consequently, there is problem that the MFD difference between the HF 361 and SMF 371 makes their connection loss large.

For instance, in the case of use of the mechanical splice 391 explained in FIG. 20, joining the HF 361 and the SMF 371 would result in a large connection loss of approximately 0.85 dB at around room temperature and a wavelength of 1.55 μm. For comparison, the loss in connecting typical SMFs with the same core diameter to each other is around 0.1 dB.

Here, shown in FIG. 21 is a temperature characteristic of connection loss in a temperature range of −30° C. to +70° C. in the mechanical splice 391 after connection. In FIG. 21, the connection loss at room temperature after connection exceeds 0.8 dB, but is recovered to around 0.1 dB with increasing temperature.

The reason why the connection loss is recovered in the high-temperature range is as follows: As indicated by the temperature characteristic line 381 of FIG. 19, the refractive index of the refractive index matching agent r7 drops with increasing temperature and becomes equal to the refractive index of the cladding 363 at around 60° C. at which point the light confinement effect vanishes, and the connection loss equal to that of typical SMFs is thereby exhibited.

In the low-temperature range, on the other hand, as indicated by the temperature characteristic line 381 of FIG. 19, conversely, the refractive index of the refractive index matching agent r7 becomes large and therefore the refractive index difference between it and the cladding 363 increases, which increases the light confinement effect, which therefore also increases the light confinement effect of a virtual core formed by the original core 362 and the 6 air holes 364 with the refractive index matching agent r7 penetrated thereinto. This makes the MFD still larger than at room temperature, which thereby increases the MFD difference between the HF 361 and SMF 371 facing each other. The connection loss at −30° C. to 10° C. is as very high as around 1 dB.

There is therefore the problem that the conventional mechanical splice 391 causes large temperature characteristic variations of the connection loss, and particularly increases the connection loss in the low-temperature range.

Accordingly, it is a fourth object of the present invention to provide an optical fiber connection portion and an optical fiber splicer, which have a small connection loss and a small temperature characteristic variation of connection loss.

In the conventional optical fiber connection portion 370 and the mechanical splice 391, on the other hand, the amount reflected at the respective end faces 361a and 371a of the HF 361 and SMF 371 is required to be small.

Accordingly, it is a fifth object of the present invention to provide an optical fiber connection portion and an optical fiber splicer, which have a small connection loss and reflection amount, and small temperature characteristic variations of connection loss and reflection amount.

DISCLOSURE OF INVENTION

First Aspect of the Invention

In accordance with the first object, an optical fiber comprises:
a plurality of air holes around a core,
wherein said air holes in proximity of a connecting end of said optical fiber are filled with a light transparent material made of a resin or a glass or the like that has a refractive index lower than that of a quartz-based material.

The optical fiber preferably comprises a photonic crystal fiber (PCF) that said air holes are periodically arranged in a hexagonal lattice form from a central portion of the optical fiber, where a crystal defect exists.

The optical fiber may comprise a Holey fiber that comprises, in said core or a cladding thereof, said plurality of air holes extending in an axial direction of the Holey fiber.

In the optical fiber, the resin filled in said air holes may be a UV-curable resin.

Further, according to the first aspect of the invention, an optical fiber connection method comprises:
by using a V-groove splicer or the like, connecting end-to-end said optical fiber as mentioned above to an optical fiber that has a mode field diameter larger than that of said optical fiber on a V-groove of said V-groove splicer.

Further, according to the first aspect of the invention, an optical fiber connector comprises:
a ferrule on which said optical fiber as mentioned above is mounted, said optical fiber being ground at an end face thereof.

According to the first aspect of the present invention, there are provided the following advantages:

(1) Even in the case of a PCF having a core and cladding whose refractive indices are equal to each other, and whose mode field diameter is much smaller than that of typical SMFs, low-loss end-to-end connection of the PCF to an SMF is possible.

(2) It is possible to prevent a degradation in strength and an increase in transmission loss.

Second Aspect of the Invention

In accordance with the second object, a sealing structure of an end portion of an optical fiber comprises:
a high refractive index core; and
a low refractive index cladding formed around said core, said cladding comprising a plurality of air holes extending in an axial direction of said optical fiber,
wherein said air holes are sealed by a sealing portion made of glass in said end portion, and said cladding comprises a portion in which said sealing portion is formed and which is provided with a diameter that is the same as that of a portion in which said sealing portion is not formed.

The sealing portion may comprise glass that has the same composition as glass composing said optical fiber.

The sealing portion may comprise glass that has a melting point lower than glass composing the optical fiber.

The optical fiber may be mounted and fixed to a connector ferrule.

Further, according to the second aspect of the invention, a method for sealing an end portion of an optical fiber comprises:

forming at said end portion of said optical fiber an end face that is substantially at right angles to an axial direction of said optical fiber in said end portion, wherein said optical fiber comprises a high refractive index core and a low refractive index cladding formed around said core, the cladding comprising a plurality of air holes extending in the axial direction;

inserting a glass powder from said end face into said air holes, said glass powder comprising the same composition as glass composing said optical fiber; and subsequently heating said end portion of said optical fiber to fuse said glass powder and thereby seal said air holes.

Further, according to the second aspect of the invention, a method for sealing an end portion of an optical fiber comprises:

forming at said end portion of said optical fiber an end face that is substantially at right angles to an axial direction of said optical fiber in said end portion, wherein said optical fiber comprises a high refractive index core and a low refractive index cladding formed around said core, the cladding comprising a plurality of air holes extending in the axial direction;

inserting a glass powder from said end face into said air holes, said glass powder comprising a melting point lower than glass composing said optical fiber; and subsequently locally heating a proximity of an end portion of said air holes to fuse said glass powder and thereby seal said air holes.

Further, according to the second aspect of the invention, a method for sealing an end portion of an optical fiber comprises:

forming at said end portion of said optical fiber an end face that is substantially at right angles to an axial direction of said optical fiber in said end portion, wherein said optical fiber comprises a high refractive index core and a low refractive index cladding formed around said core, the cladding comprising a plurality of air holes extending in the axial direction; and subsequently locally heating a proximity of an end portion of said air holes to fuse said glass powder and thereby seal said air holes.

The end portion of said air holes may be locally heated and fused by irradiating thereto carbon dioxide gas laser light to seal said air holes.

The optical fiber may be beforehand mounted on and fixed to a connector ferrule.

According to the second aspect of the invention, there are provided the following advantages.

The optical fiber end sealing structure of the invention allows the sealing portion made of glass to seal the air holes, and thereby prevent a degradation in mechanical strength due to invasion of moistures, etc., and a variation in optical properties due to dew condensation caused by temperature variations. Also, since the cladding diameter of a portion in which is formed the sealing portion is the same as the cladding diameter of a portion in which is formed no sealing portion, it is possible to maintain dimensions around the end face, with a cladding diameter maintained accurately, without affecting waveguide structure of the optical fiber. This allows facilitating connection of Holey fibers, and a Holey fiber and a typical single mode fiber. Accordingly, since a variety of applications will be possible in the future, great contributions can be made to future developments of optical fiber applied technologies.

Further, the optical fiber end sealing method of the invention can ensure the realization of the above optical fiber end sealing structure, since glass powder, the constituents of which are the same as constituents of glass constituting the optical fiber, is inserted into the air holes, followed by heating the end of the optical fiber to fuse the glass powder, and thereby seal the air holes. Also, since there is used the glass powder, the constituents of which are the same as constituents of glass constituting the optical fiber, the sealing portion obtained has less incidence of strains and can therefore provide excellent reliability.

Further, the optical fiber end sealing method of the invention can choose a heating temperature at which the optical fiber is not fused, since glass powder, whose melting point is lower than the melting point of glass constituting the optical fiber, is inserted into the air holes, followed by locally heating the end of the optical fiber to fuse the glass powder, and thereby seal the air holes. This allows heating up to the cladding surface, and wide choices of conventional methods as heating means.

Further, the optical fiber end sealing method of the invention allows the end of the air holes to be sealed by a convenient method without using glass powder, since the end of the air holes is locally heated to seal the air holes.

Third Aspect of the Invention

In accordance with the third object, an optical fiber comprises:

a high refractive index core and a low refractive index cladding formed around said core, the cladding comprising a plurality of air holes extending in an axial direction of said optical fiber; and a sealing portion formed at an end portion of said plurality of air holes, wherein said sealing portion comprises a quartz-based fine particle that has a refractive index equal to or lower than that of said cladding, and an optical adhesive that has a refractive index equal to or lower than that of said cladding.

The quartz-based fine particle may comprises a diameter of 1 μm or less.

The quartz-based fine particle may be doped with an additive that reduces the refractive index thereof.

The optical adhesive may be a UV-curable optical adhesive.

An optical fiber connector may comprise said optical fiber as mentioned above mounted on a ferrule.

According to the third aspect of the present invention, there are provided the following advantages:

The optical fiber of the invention can provide a reliable end-face-sealed optical fiber connector with no ground powder and abrasive remaining on the fiber end face, since the sealing portion is formed at the end of the plurality of air holes. This can enhance reliability after connector processing, and provide a good-optical-property Holey fiber connector. Also, since the sealing portion comprises fine quartz particles whose refractive index is the same as or smaller than that of the cladding, and an optical adhesive whose refractive index is the same as or smaller than that of the cladding, it is possible to prevent the occurrence of foams in the adhesive cured at the fiber end, and thereby make the loss low.

Fourth Aspect of the Invention

In accordance with the fourth object, a connection portion of an optical fiber comprises:

said optical fiber connected to another optical fiber, said optical fiber comprising a plurality of air holes in a cladding formed around a core of said optical fiber, wherein said optical fiber is joined end-to-end to said another optical fiber through a refractive index matching agent that has a refractive index at a minimum temperature in practical use lower than that of said core.

Further, according to the fourth aspect of the invention, a connection portion of an optical fiber comprises:

said optical fiber connected to another optical fiber, said optical fiber comprising a plurality of air holes in a cladding formed around a core of said optical fiber, wherein said optical fiber is joined end-to-end to said another optical fiber through a refractive index matching agent that has a refractive index at a minimum temperature in practical use lower than that of said cladding.

The refractive index matching agent may comprise an optical refractive index of 1.458 or less in a 1.3 to 1.55 µm wavelength band at a temperature of −30° C., and an average refractive index temperature coefficient of $-8.0 \times 10^{-4}/°$ C. or more and less than $0/°$ C. in a temperature range of −30° C. to +70° C.

An optical fiber splicer may comprise said connection portion of the optical fiber as mentioned above housed in a chassis.

According to the fourth aspect of the invention, it is possible to provide an optical fiber connection portion and an optical fiber splicer, which have a small connection loss and a small temperature characteristic variation of connection loss.

Fifth Aspect of the Invention

In accordance with the fifth object, a connection portion of an optical fiber comprises:

said optical fiber connected to another optical fiber, said optical fiber comprising a plurality of air holes in a cladding formed around a core of said optical fiber, wherein said optical fiber is joined end-to-end to said another optical fiber through a refractive index matching mixture that has a refractive index in a temperature range in practical use not more than that of said cladding, and that comprises a micro-body with an average diameter or length of 100 nm or less.

The micro-body may be a fine particle comprising mainly pure quartz.

The refractive index matching mixture may comprise a refractive index matching agent with said micro-body mixed therewith, and a mixture weight ratio of said refractive index matching agent and said micro-body may be 10:1 to 1:1.

An optical fiber splicer may comprise said connection portion of the optical fiber as mentioned above housed in a chassis.

According to the fifth aspect of the invention, it is possible to provide an optical fiber connection portion and an optical fiber splicer, which have a small connection loss and reflection amount, and small temperature characteristic variations of connection loss and reflection amount.

BEST MODE FOR CARRYING OUT THE INVENTION

Figure 1:
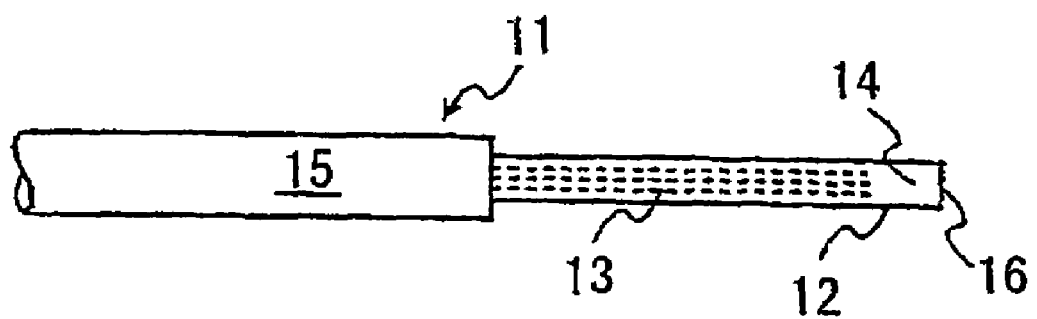
FIG. 1 is a side view illustrating a photonic crystal fiber (PCF) according to a first preferred embodiment of the invention.

The preferred embodiments according to the invention will be explained below referring to the drawings.

FIG. 1 is a side view illustrating a photonic crystal fiber (PCF) according to a first preferred embodiment of the invention.

Figure 5:
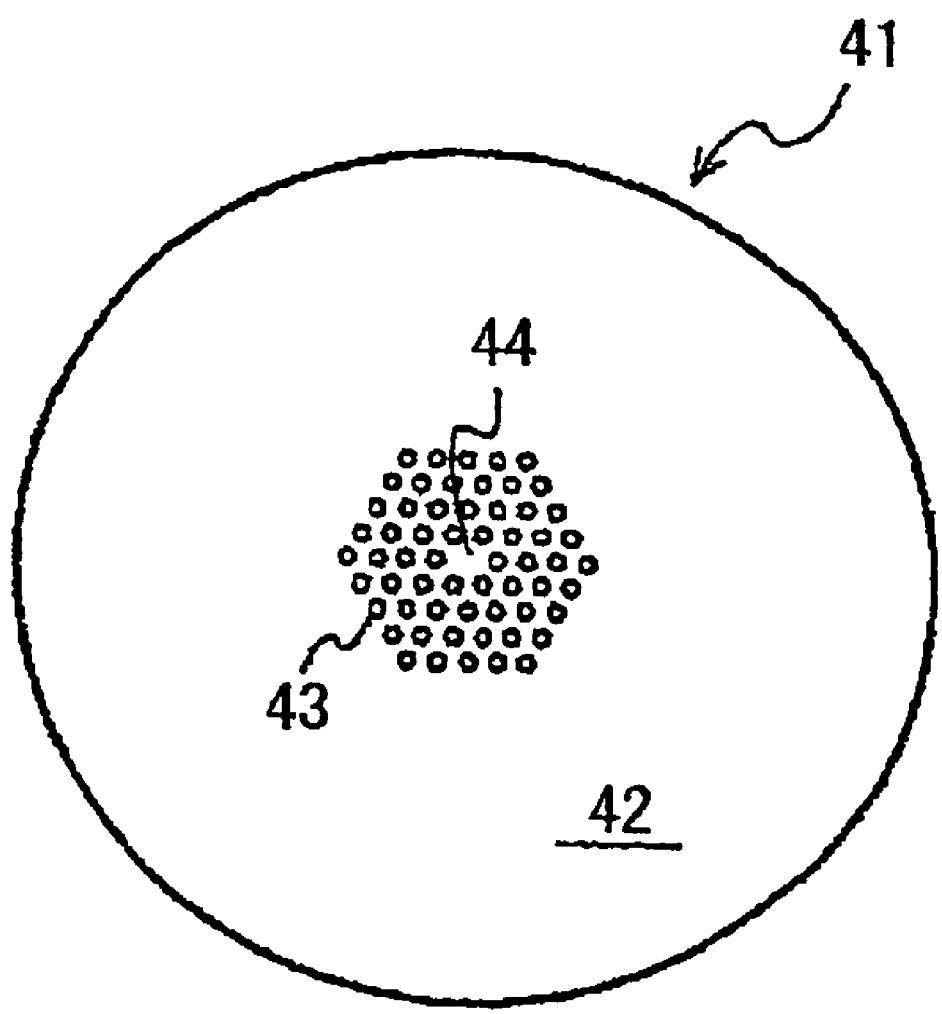
FIG. 5 is a cross-sectional view illustrating a conventional photonic crystal fiber.

First, a PCF 11 of this embodiment is the same as the PCF 41 explained in FIG. 5, and its details are therefore omitted. The optical fiber is used in the form of a fiber core whose cladding is covered with a coating layer made of UV resin, and its connection portion to a connector such as a ferrule is used with its cover layer stripped.

As illustrated in FIG. 1, air holes 13 in proximity 12 of the connecting end of the PCF 11 are filled with a UV-curable resin 14, as a filler, whose refractive index is lower than that of quartz. The UV-curable resin 14 is in a liquid form at room temperature before its use, and is cured by being irradiated with UV. The UV-curable resin 14 used in this embodiment is an epoxy-based fluorine-containing UV-curable resin whose refractive index after curing is adjusted to 1.42.

The refractive index of the UV-curable adhesive 14 to fill the PCF 11 of this embodiment is 1.42, while the refractive index of quartz glass forming the PCF 11 is 1.458. It is essential that the optimum refractive index of the filler to fill the air holes 13 be smaller than the refractive index 1.458, which requires choosing the optimum refractive index of the filler according to the conditions of the diameter of the air holes, the number of the air holes, and the spacing between the air holes (the density thereof) because of its variation due thereto. Even though the refractive index of the filler is lower than that of quartz glass, if large or small compared to the optimum refractive index, its connection loss becomes large due to the following reasons.

When the refractive index of the filler is larger than its optimum, since the relative refractive index difference between the air holes 13 filled and the core (quartz) becomes small, the light confinement effect to the central core is attenuated, which consequently increases the mode-field diameter (MFD) at the connecting end 12. Thus, an MFD failure is caused between the PCF 11 and an SMF, resulting in a large connection loss.

When the refractive index of the filler is smaller than its optimum, on the other hand, since the relative refractive index difference between the air holes 13 filled and the core (quartz) becomes relatively large, the light confinement effect to the central core is intensified, which consequently decreases the MFD in the proximity 12 of the connecting end. Thus, the MFD of the PCF 11 becomes smaller than that of the connected SMF, likewise resulting in a large connection loss due to the MFD failure.

Accordingly, after filling the cylindrical air holes 13 with the UV-curable resin 14, it is required to choose the refractive index of the filler such that the mode-field diameter of the PCF 11 is equal to the mode-field diameter of the SMF.

The process of fabricating the PCF 11 will be explained below.

A cover 15 of the PCF 11 is first stripped a few millimeters. An end portion 16 is then cut by a fiber cutter such that its cutting face is vertical. A UV-curable adhesive 14 is then applied to an end face 16. The UV-curable adhesive 14 applied to the end face 16, due to a capillary phenomenon, penetrates into the cylindrical air holes 13 in a few seconds or a few minutes. During the penetration, time to hold the PCF 11 highly depends on the viscosity, surface tension of the adhesive 14, and the air-hole diameter. In the case of cutting the end face 16 by polishing or the like, it is required to secure a penetration length of the adhesive 14 taking account of the cut-off length. The sufficient length is not less than 100 μm when the cutting face of the PCF 11 is used directly as the end face 16 for connection.

Then, wiping surplus adhesive 14 attached to the end face 16, with a gauze or the like, and irradiating UV light to the side of the PCF 11 with a UV irradiation apparatus to cure the UV-curable adhesive 14 penetrated into the air holes 13, the PCF 11 is fabricated.

The process of joining the PCF 11 and a single-mode fiber (an SMF) 21 by using a V-groove splicer will be explained below.

Figure 2A:
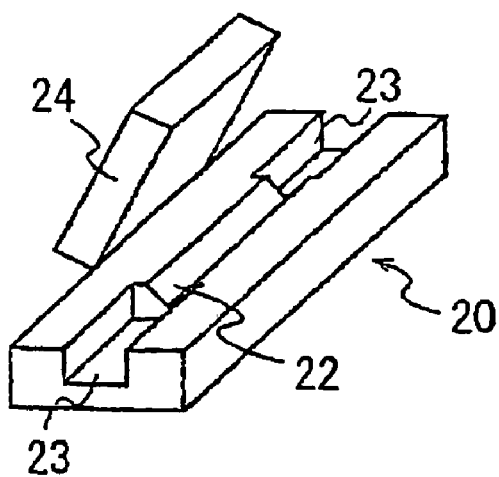
FIG. 2A is a perspective view illustrating a V-groove splicer.

FIG. 2A illustrates a V-groove splicer 20 comprising a joining V-shaped groove 22 where the end faces of both fibers 11 and 21 are joined together, cover holding portions 23 provided at both sides thereof to hold the fibers 11 and 21, respectively, and a holding lid 24 to press down the end-to-end joined fibers 11 and 21 to hold them.

Figure 2B:
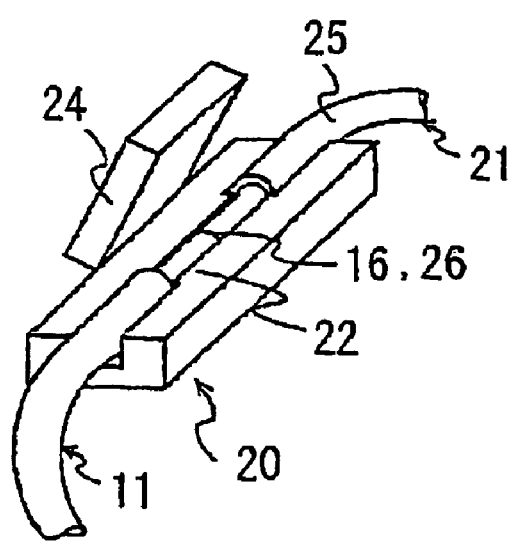
FIG. 2B is a perspective view illustrating the step of connecting the optical fiber of FIG. 1 and a single mode fiber using the V-groove splicer.

As illustrated in FIG. 2B, a cover 25 of a quartz-based SMF 21 is first stripped and an end face 26 thereof is then cut by a fiber cutter. The end face 26 of the SMF 21 and the end face 16 of the PCF 11 are joined together in the V-shaped groove 22, while the SMF 21 and PCF 11 each are fixed at the cover holding portions 23.

Figure 2C:
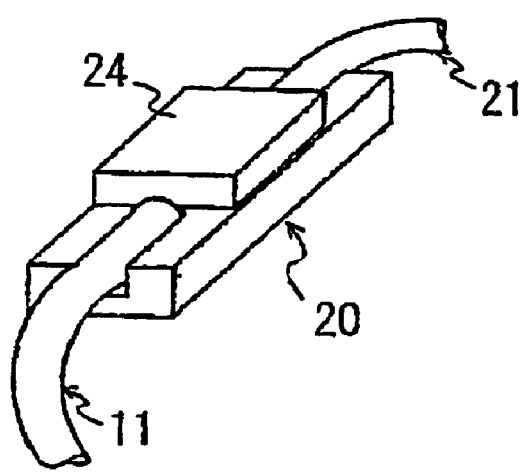
FIG. 2C is a perspective view illustrating an end-to-end joined state of the optical fiber of FIG. 1 and the single mode fiber through the V-groove splicer.

Finally, as illustrated in FIG. 2C, the holding lid 24 is pressed down against the joining V-shaped groove 22 to fix the SMF 21 and the PCF 11. Thus, the joining process is completed.

The functions of this embodiment are as follows.

The plural minute air holes 13 of the PCF 11 are, in the proximity 12 of the connecting end of the PCF 11, filled with the UV-curable adhesive 14 with a refractive index lower than the cladding. Then, by irradiating UV light to cure it, the air holes 13 are sealed. Therefore, even in the PCF 11 with a core and a cladding that have the same refractive index, a photonic crystal structure can be formed in the proximity 12 of the connecting end. Thereby, light can be confined in the central region of the PCF 11.

Thus, the end-to-end joining to an optical fiber with a larger MFD than that of the PCF 11 is possible. When the SMF 21 and PCF 11 are joined together by the V-groove splicer 20 as explained above, the connection loss is as low as 0.55 dB.

Also, the structure that the air holes 13 in the proximity 12 of the connecting end of the PCF 11 can prevent the invasion of ground powder, moistures, and other foreign bodies when the end face 16 of the PCF 11 is ground.

As another embodiment, there is explained the case where the PCF 11 according to the first embodiment is connected to a ferrule for FC connectors.

Figure 3:
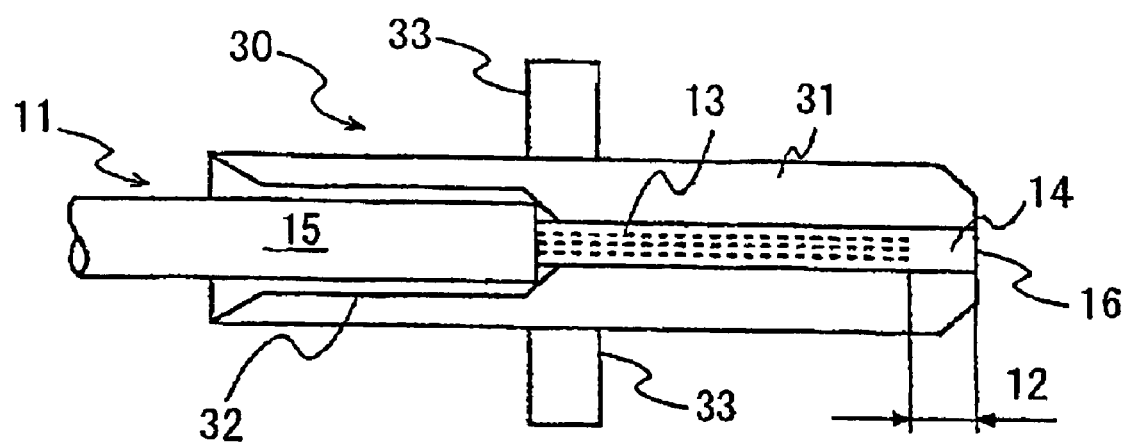
FIG. 3 is a cross-sectional view of a ferrule for FC connectors to which is mounted the optical fiber of FIG. 1.

FIG. 3 is a cross-sectional view of a ferrule 30 for FC connectors to which the PCF 11 is connected.

As illustrated in FIG. 3, the ferrule 30 which is a component to compose an optical connector comprises a fixing portion 31 for fixing the PCF 11 with the cover 15 stripped, and a fiber-holding portion 32 into which the cover 15 of the PCF 11 is fitted. The FC-connector ferrule 30 with a cylindrical shape is used for single-core optical connectors. The PCF 11 is fixed to the fixing portion 31 of the ferrule 30 though an adhesive. The ferrule 30 with the PCF 11 fitted therein is connected to an optical connector, and, in the case of an FC connector, is fixed to the optical connector through a fastening portion 33 such as a screw and a pressure spring.

The proximity 12 of the connecting end of the PCF 11 with the UV-curable resin 14 filled therein is fixed to the fixing portion 31 of the ferrule 30, and the fiber core 15 is adhered to the holding portion 32, then the end face 16 of the connecting portion is ground. In the ferrule 30 to be connected to the optical connector, since the air holes 13 in the proximity 12 of the connecting end of the PCF 11 are filled with the UV-curable resin 14, the invasion of ground powder, moisture, and other foreign bodies produced in the grinding can be prevented, whereby an increase in transmission loss accompanied by the invasion can be prevented, and the faster-than-usual fatigue and deterioration of fiber strength can be avoided.

The filler to be filled into the air holes 13 in the proximity 12 of the connecting end of the PCF 11 is not limited to the UV-curable resin 14, and it may be any light transparent material such as glass.

The PCF 11 is not limited to be applied to the V-groove splicer 20, such as a mechanical splice, and to the ferrule 30 for FC connectors, and it may be applied to capillary splicers and other commercial connectors.

Figure 4:
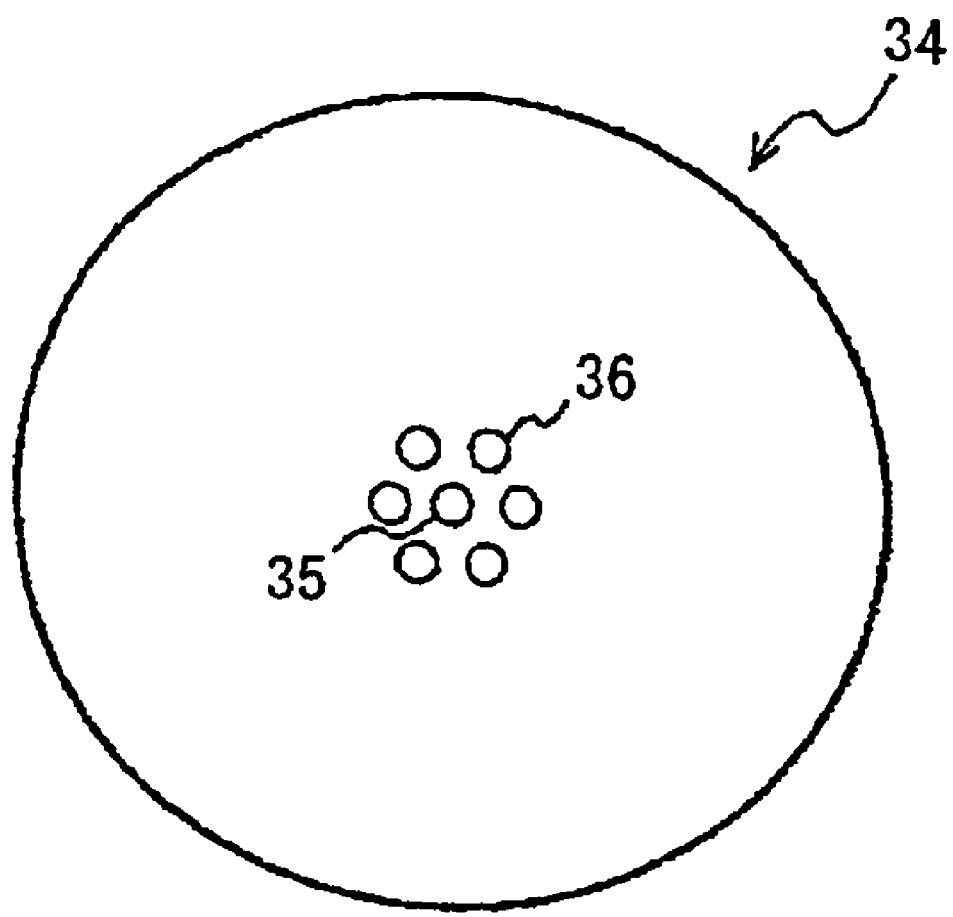
FIG. 4 is across-sectional view of a Holey fiber as another application example.

Also, the concept of the invention can be applied not only to the PCF 11 with the core and the cladding that have the same refractive index as used in this embodiment, but also to a PCF with a core and a cladding that have different refractive indices, and to a Holey fiber 34 illustrated in FIG. 4 as well. The Holey fiber 34 is an optical fiber that has plural air holes 36 around its core 35. It can be preferably used for an optical fiber coiled cord which forms a small-diameter coil because it has such a high bending/twisting tolerance that can suppress an increase in transmission loss.

Referring to the drawings, the structure and method for sealing the end of an optical fiber end according to second and third embodiments of the invention will be described below.

Figure 6A:
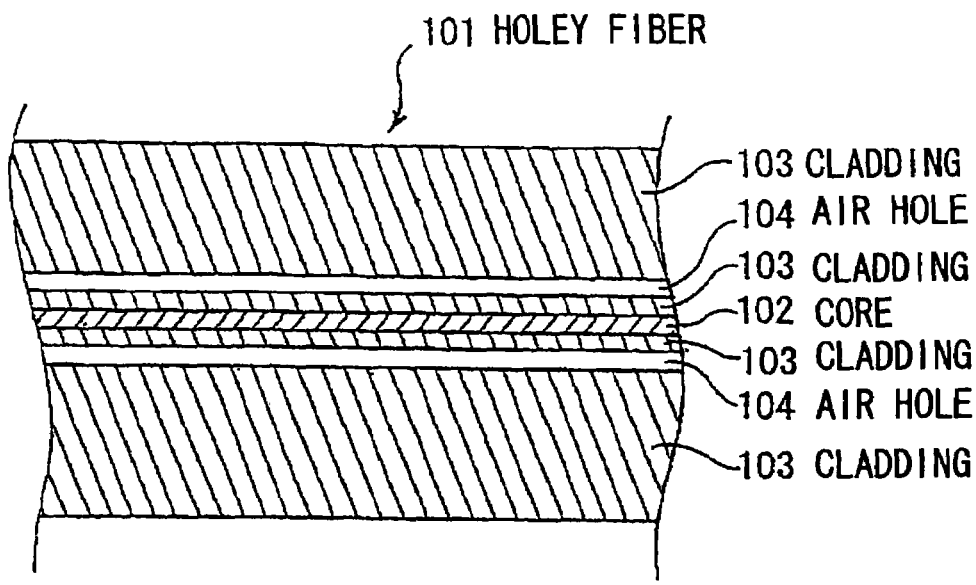
FIGS. 6A and 6B are longitudinal and transverse cross-sectional views, respectively, illustrating a structural example of a Holey fiber 101 used in a sealing structure for an end of the optical fiber of the invention.
Figure 6B:
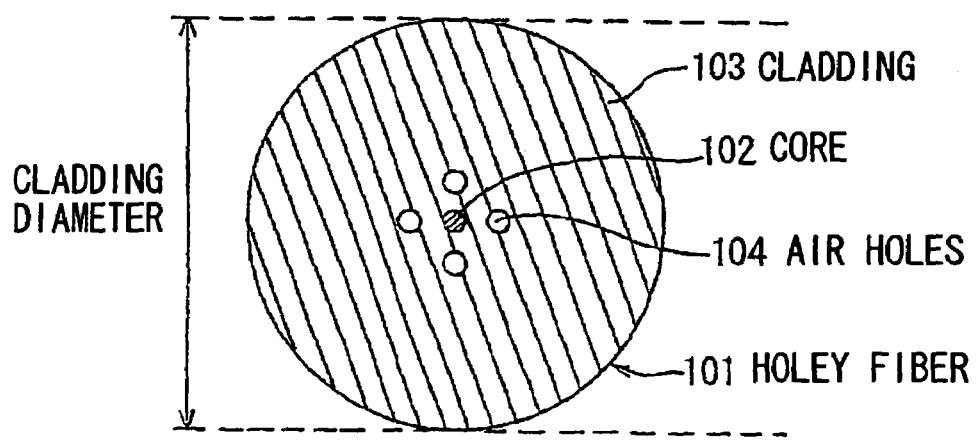

FIGS. 6A and 6B illustrate a structural example of a representative Holey fiber 101 used in the sealing structure for the above optical fiber end. In FIGS. 6A and 6B, the Holey fiber 101 has a high refractive index core 102 and a low refractive index cladding 103 formed to surround the core 102, where the cladding 103 has four air holes 104 adjacent to the core 102 and extending in the fiber axial direction.

Figure 7:
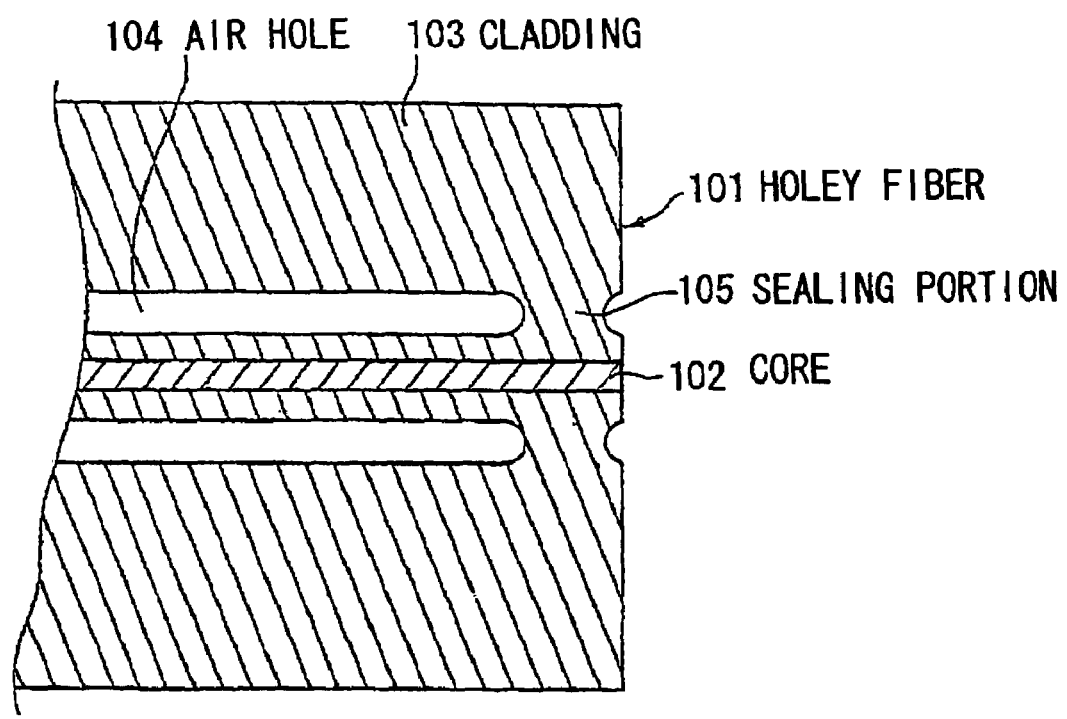
FIG. 7 is a longitudinal cross-sectional view illustrating a sealing structure for an end of an optical fiber according to a second embodiment of the invention.

FIG. 7 is a longitudinal cross-sectional view illustrating the sealing structure for the end of the optical fiber according to the second embodiment of the invention. FIG. 7 illustrates a more enlarged view of the optical fiber end than in FIG. 6. In the sealing structure for this optical fiber end, the respective fore-ends of the air holes 104 extending in the fiber axial direction are sealed by a sealing portion 105. This sealing portion 105 is formed in a recessed position of the end face of the Holey fiber 101, i.e., in a slightly inner position from the end face. Also, the diameter of the cladding 103 is totally the same in both positions in which are respectively formed the sealing portion 105 and the air holes 104. Further, although the two air holes 104 are sealed by the sealing portion 105 in FIG. 7, the ends of the other two air holes 104 not illustrated are likewise sealed.

The sealing method for realizing the sealing structure for this optical fiber end will be explained below.

At the end of the Holey fiber 101, an end face is first formed substantially at right angles to its axial direction, followed by fine glass powder insertion from this end face into the air holes 104. The glass powder is quartz glass that is the material for constituting the optical fiber. The particle diameter of the glass powder used may preferably be not more than 1 μm. This glass powder can be caused to penetrate into the air holes 104 by heaping the glass powder and inserting the optical fiber end into the heap of the glass powder. It can also be more easily inserted into the air holes 104 by mixing alcohol into the glass powder to form a paste.

Next, the end of the Holey fiber 101 is heated by being irradiated with carbon dioxide gas laser light. The wavelength of the carbon dioxide gas laser light is on the order of 10 μm, so as to be well absorbed into the glass to produce heat. A condenser lens used for collecting laser light may be a lens made of zinc selenide or germanium which are transparent in this wavelength. Such a laser-heating optical system for fiber ends is described in detail in Japanese patent application laid-open No. 7-318756. Using such an optical system with carbon dioxide gas laser light, although the core 102 and the air holes 104 therearound are simultaneously heated by laser light, the partial heat treatment may be performed sequentially by moving a laser light spot. The glass powder is heated until it is fused sufficiently. The heating is then stopped, followed by allowing the glass to solidify to form the sealing portion 105 in the recessed portion of the end face of the Holey fiber 101, as illustrated in FIG. 7.

This sealing method can prevent variation in cladding diameter by lessening an inflow of the cladding material since the air holes 104 are sealed by fusing the glass powder. The method can also prevent variation in cladding diameter by heating only the part of the end face without heating the peripheral cladding since the laser light spot can be made sufficiently smaller than the cladding diameter (generally, 125 μm) by the condenser lens system using carbon dioxide gas laser light as a heating means. The method can also be advantageous in reliability by preventing strains from occurring in the sealing portion 105 since quartz glass for constituting the optical fiber is used as the glass powder.

As an alternative method for forming the sealing portion 105, the sealing portion 105 may be formed by using another glass powder with a lower melting point than that of quartz glass, to be caused to penetrate into the air holes 104 from the end face of the Holey fiber 101, and by using a heating means (gas discharge, a gas burner, an electrically-heated wire, etc., for optical fiber fusion splice) to fuse the glass powder sufficiently.

This sealing method can also prevent variation in cladding diameter by lessening an inflow of the cladding material since the air holes 104 are sealed by fusing the glass powder. The method can also allow heating including the cladding surface since heating temperature is chosen in a range in which the optical fiber is not fused by using, as the sealant, the glass of the kind whose melting point is lower than that of quartz glass. Accordingly, the method also has an advantage of being capable of wide choices of conventional heating means such as gas discharge, a gas burner, an electrically-heated wire, etc., for optical fiber fusion splice. Of course, the carbon dioxide gas laser heating method is also applicable.

Figure 8:
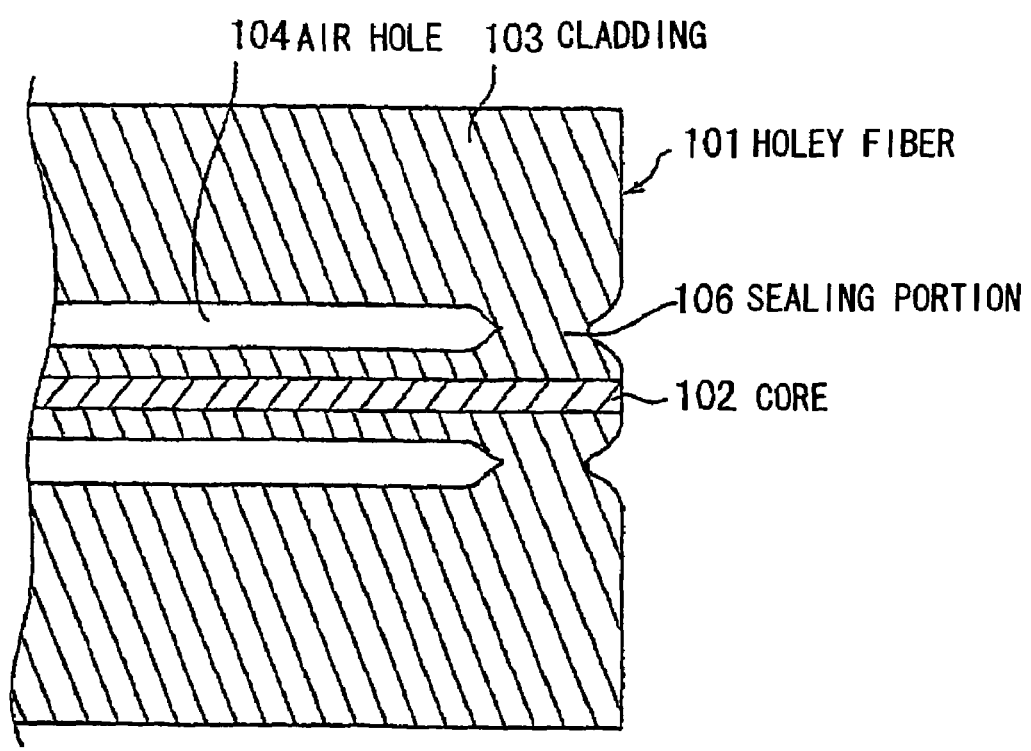
FIG. 8 is a longitudinal cross-sectional view illustrating a sealing structure for an end of an optical fiber according to a third embodiment of the invention.

FIG. 8 illustrates a sealing structure for an end of an optical fiber according to a third embodiment of the invention. In this sealing structure, fore-ends of axially extending air holes 104 are also sealed by a sealing portion 106. Also, the diameter of cladding 103 is totally the same in both positions in which are respectively formed the sealing portion 106 and the air holes 104. Further, a recessed portion of the end of a Holey fiber 101 is slightly deeper than the recess of FIG. 7.

The method for forming this sealing portion 106 is as follows: At the end of the Holey fiber 101, an end face is formed substantially at right angles to its axial direction, followed by partial heat treatment of the end face by the above-mentioned carbon dioxide gas laser without inserting glass powder. This allows an inflow of fused cladding material from the end face to seal the air holes.

In this case, as illustrated in FIG. 6, since the opening area of the air holes 104 is sufficiently smaller than the cross-section of the cladding 103, and the end is partially heated, the cladding material flows from the end face of the Holey fiber 101 deep into the air holes 104, thereby sealing the end of the Holey fiber 101, and preventing variation in cladding diameter.

As illustrated in FIG. 7 or 8, by forming the end of the Holey fiber 101, there can also be used a general optical fiber connection method, for example, a mechanical connection method using a V-groove called "mechanical splice". Also, optical connector connection can be implemented by being mounted to a ferrule of an MT connector or single-core connector.

Figure 9:
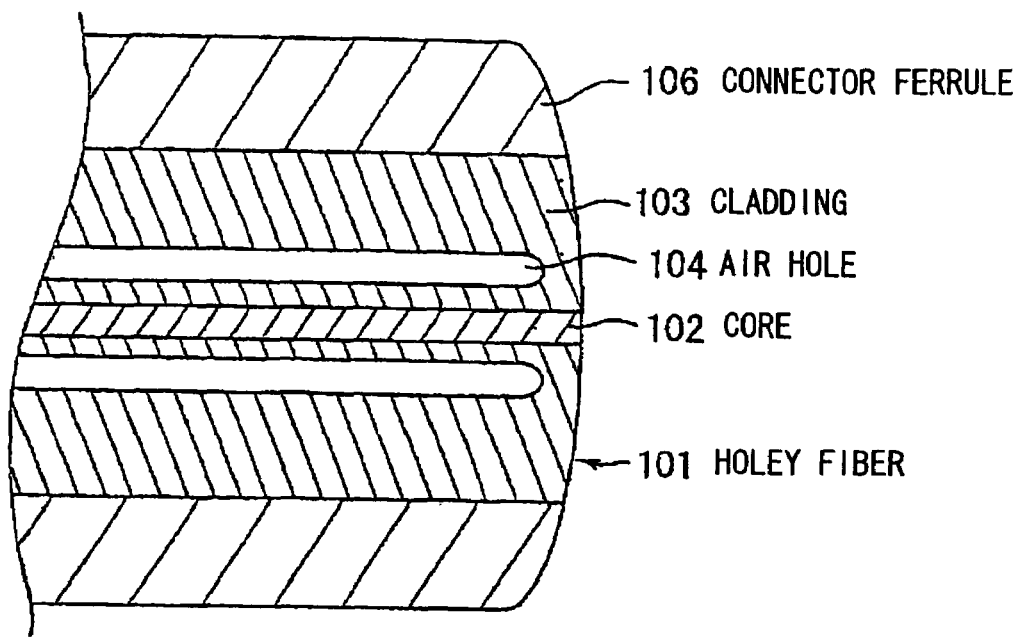
FIG. 9 is a longitudinal cross-sectional view illustrating an example where a ferrule is mounted to an end of an optical fiber according to the invention.

In mounting a ferrule, when a stopper is provided at a fore-end of the ferrule to insert the Holey fiber 101 from rearward, as illustrated in FIG. 9, the end face of the Holey fiber 101 is caused to coincide with the end face of the connector ferrule 106. Thereafter, if necessary, as in the case of general optical fibers, the end face of the connector ferrule 106 may be ground.

Further, the air holes may be sealed by attaching the Holey fiber 101 to the connector ferrule 106 and ground, followed by heat treatment. In this case, because the shape of the Holey fiber 101 end is deformed by the heating, its shape may be trimmed by re-grinding the end face of the connector ferrule 106. Since the sealing portion of the air holes is slightly deeper than the end face, the grinding allows removing remaining recesses of the end face.

An optical fiber and optical fiber connector according to a fourth embodiment of the invention will be explained below referring to the drawings.

Figure 10:
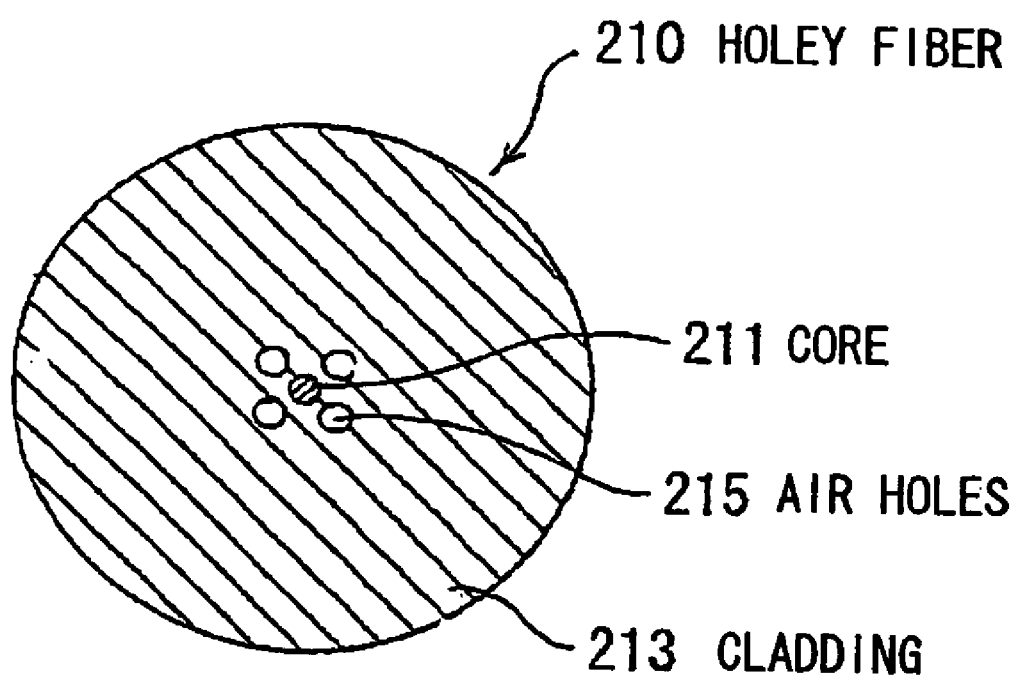
FIG. 10 is a transverse cross-sectional view illustrating a Holey fiber used in a fourth embodiment of the invention.

FIG. 10 illustrates a cross-sectional structure of a Holey fiber 210 used in the fourth embodiment of the invention. In FIG. 10, the Holey fiber 210 has a high refractive index core 211 and a low refractive index cladding 213 formed to surround the core 211, where the cladding 213 has, adjacent to the core 211, four air holes 215 disposed axisymmetric around the center axis of the core 211 and equally-spaced each other.

The Holey fiber 210 can use a typical 1.3-μm band single mode fiber. Also, the inside diameter of the air holes 215 is preferably not less than 3 μm and not more than 10 μm, and can for example be 7 μm. The center of each air hole 215 is for example positioned on a circumference of radius 12 μm from the center of the core 211. The air hole 215 is filled with air or inert gas, so that the refractive index of the air holes 215 is 1. Also, the refractive index of the cladding 213 is 1.458, for example, and the core 211 is doped with about 6-9 mol % of germanium to make its refractive index higher than that of the cladding 213.

Figure 11:
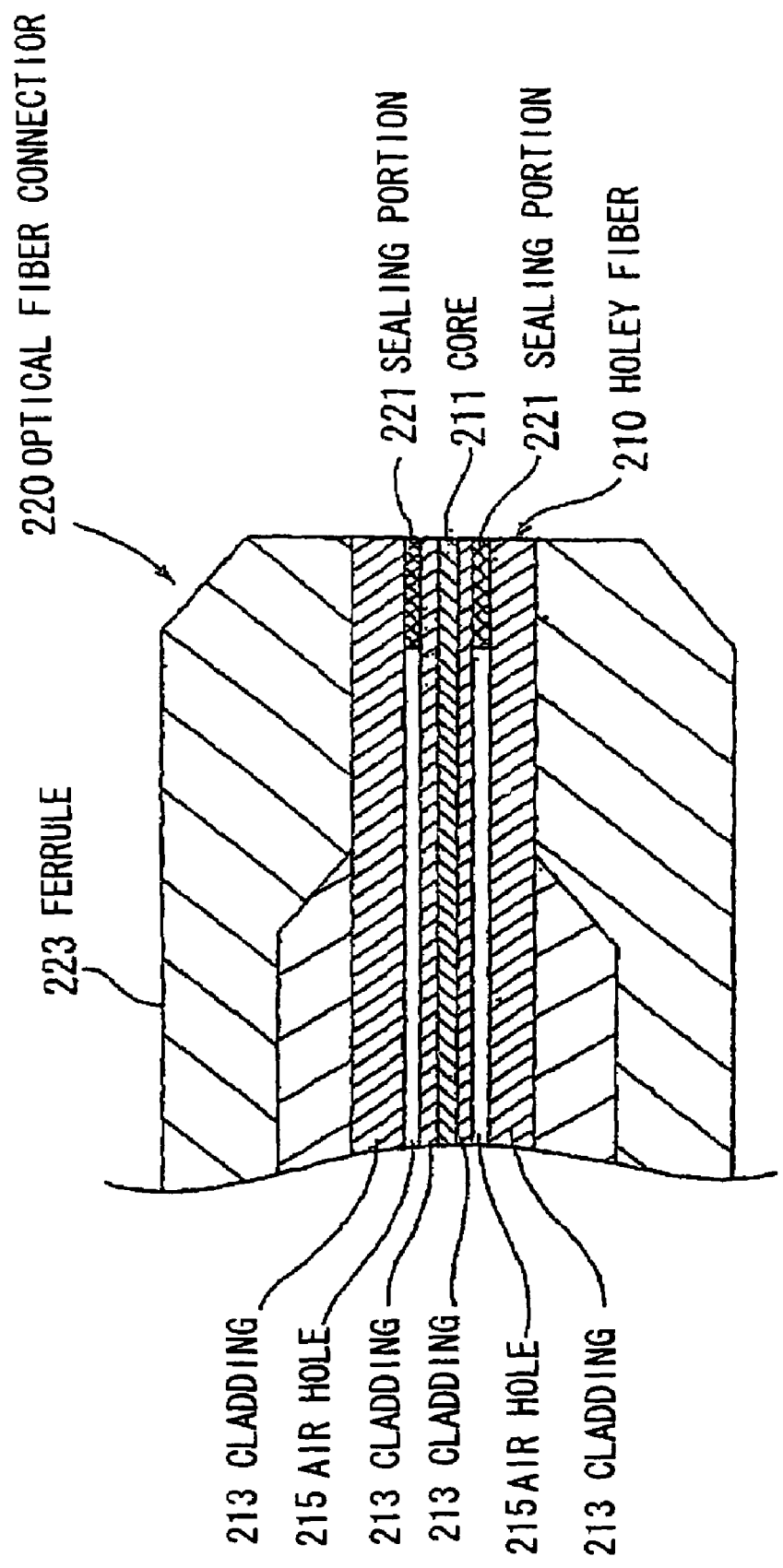
FIG. 11 is a longitudinal cross-sectional view illustrating an optical fiber connector according to the fourth embodiment of the invention.

FIG. 11 is a longitudinal cross-sectional view illustrating the optical fiber connector according to the fourth embodiment of the invention. In the optical fiber connector 220, the respective end portions of the air holes 215 extending in the axial direction of the Holey fiber 210 are sealed by a sealing portion 221, and a ferrule 223 is mounted around the Holey fiber 210. Further, although the two air holes 215 of the Holey fiber 210 are sealed by the sealing portion 221 in FIG. 11, the end portions of the other two air holes 215 not illustrated are likewise sealed.

This sealing portion 221 comprises fine quartz powder and a UV-curable optical adhesive. The refractive indices of the quartz powder and UV-curable optical adhesive constituting the sealing portion 221 are both required to be the same as or smaller than the refractive index of the cladding 213. The reason for that is explained below.

The Holey fiber 210 has the excellent bending property because of the air holes 215 adjacent to the core 211. If the air holes 215 are filled with optical material with a higher refractive index than that of the cladding 213 to form the sealing portion 221, portion with a higher refractive index than that of the cladding 213 is produced also in portion other than the original core 211, so that there are formed a plurality of cores 211. In that case, when the spacing between the core 211 and the air holes 215 of the Holey fiber 210 is close to each other on the order of a light wavelength, an optical coupling phenomenon occurs, which causes light propagating through the original core 211 to transfer into the air holes 215. The light transferred propagates through the sealing portion 221, but does not propagate in space in which is formed no sealing portion 221, which therefore causes a large loss. Accordingly, it is desirable that the refractive index of the sealing portion 221 sealing the air holes 215 of the Holey fiber 210 be not higher than the refractive index of the cladding 213. If the air holes 215 are filled with optical material with the same refractive index as that of the cladding 213 to form the sealing portion 221, because of the same structure as that of typical optical fibers with no air holes 215, the excellent bending property of the Holey fiber 210 is impaired. For this reason, it is preferable that the refractive index of the sealing portion 221 sealing the air holes 215 of the Holey fiber 210 be lower than the refractive index of the cladding 213.

The particle diameter of fine quartz particles comprising the sealing portion 221 is not more than 1 μm, preferably not more than 100 nm, and most preferably 30-40 nm. The particle diameter of not more than 100 nm allows increasing the volume ratio of the fine quartz particles in the sealing portion 221, i.e., the mixing ratio of the fine quartz particles to the optical adhesive, which therefore makes it possible to inhibit the incidence of foams during curing of the optical adhesive. The refractive index of the fine quartz particles is the same as the refractive index of the quartz constituting the cladding 213 of the Holey fiber 210, (i.e., 1.458), but it can be reduced about −0.5% to −0.7% by using fluorine-added quartz nanoparticles in which fluorine is added to the fine quartz particles.

The UV-curable optical adhesive may on the other hand use an epoxy-based UV-curable adhesive (Optodyne® 1100, made by Daikin Industries, Ltd.) whose refractive index is 1.430 at room temperature. Generally, the refractive index of optical refractive index materials depends on temperature so that it increases with decreasing temperature. For that reason, taking the effect of temperature into account, the above-mentioned optical adhesive has a refractive index of the order of 1.45 even at −30° C., which can be lower than the refractive index of the cladding 213, i.e., 1.458.

In the mixing ratio of the fine quartz particles and the optical adhesive, the higher the percentage of the fine quartz particles, the lower the incidence of foams after curing of the optical adhesive, but too high a percentage of the fine quartz particles would result in no fluidity of the optical adhesive containing the fine quartz particles prior to curing, which would therefore result in difficulty in filling it into the air holes 215 of the Holey fiber 210. According to experiments by the inventors, it has been found that the weight ratio of the optical adhesive and the fine quartz particles ranged between 1:1 to 10:1 ensures practical compatibility between the inhibition of the incidence of foams and the workability of the filling of the air holes 215.

Because the temperature dependency of the refractive index of the fine quartz particles is negligible compared to that of the refractive index of the optical adhesive, the refractive index of the whole of the sealing portion 221 filled into the air holes 215 can stably be lower than that of the quartz constituting the cladding 213. For that reason, optical properties including bending properties can be stabilized.

The fabrication method for the optical fiber connector 220 will be explained below.

At the end of the Holey fiber 210, an end face is first formed substantially at right angles to its axial direction, followed by penetration of a mixture of fine quartz particles and UV-curable optical adhesive from the end face of the Holey fiber 210 into the air holes 215, and subsequent UV irradiation to cure the optical adhesive, followed by forming the sealing portion 221. Next, the ferrule 223 is mounted to the Holey fiber 210 so that the end face of the Holey fiber 210 is caused to coincide with the end face of the ferrule 223. Subsequently, if necessary, as in the case of general optical fibers, the end face of the ferrule 223 may be ground.

Further, it is desirable that the sealing portion 221 be positioned from the end face of the optical fiber connector so as to seal the end face of the air holes 215, and be formed not less than 100 μm deep from the end face of the optical fiber connector from the point of view of long-term reliability, which would however not have to be specified with mechanical strength.

As described above, the advantages of the optical fiber connector of this embodiment are as follows.

(1) Since the sealing portion 221 seals the end face of the air holes 215, no ground powder and abrasive are left on the end face of the fiber, and the end face sealed and reliable optical fiber connector can be provided.

(2) Since the sealing portion 221 comprises the UV-curable optical adhesive and the fine quartz particles, volume contraction when the optical adhesive is cured can be suppressed by the fine quartz particles. For this reason, the incidence of foams within the adhesive cured at the fiber end can be prevented, thereby allowing making loss low.

(3) Since the end face of the air holes 215 is sealed by the sealing portion 221 formed so that its refractive index is smaller than that of the cladding 213, optical properties including bending property can be stabilized.

An optical fiber connection portion and optical fiber connector according to a fifth embodiment of the invention will be explained below referring to the drawings.

Figure 12:
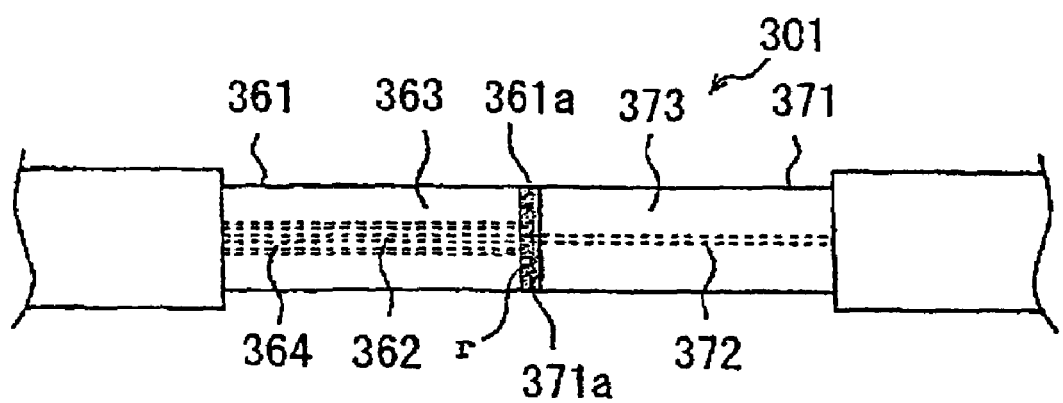
FIG. 12 is a side view illustrating an optical fiber connection portion according to a fifth embodiment of the invention.

FIG. 12 illustrates a side view of an optical fiber connection portion according to the fifth preferred embodiment of the invention.

Figure 17:
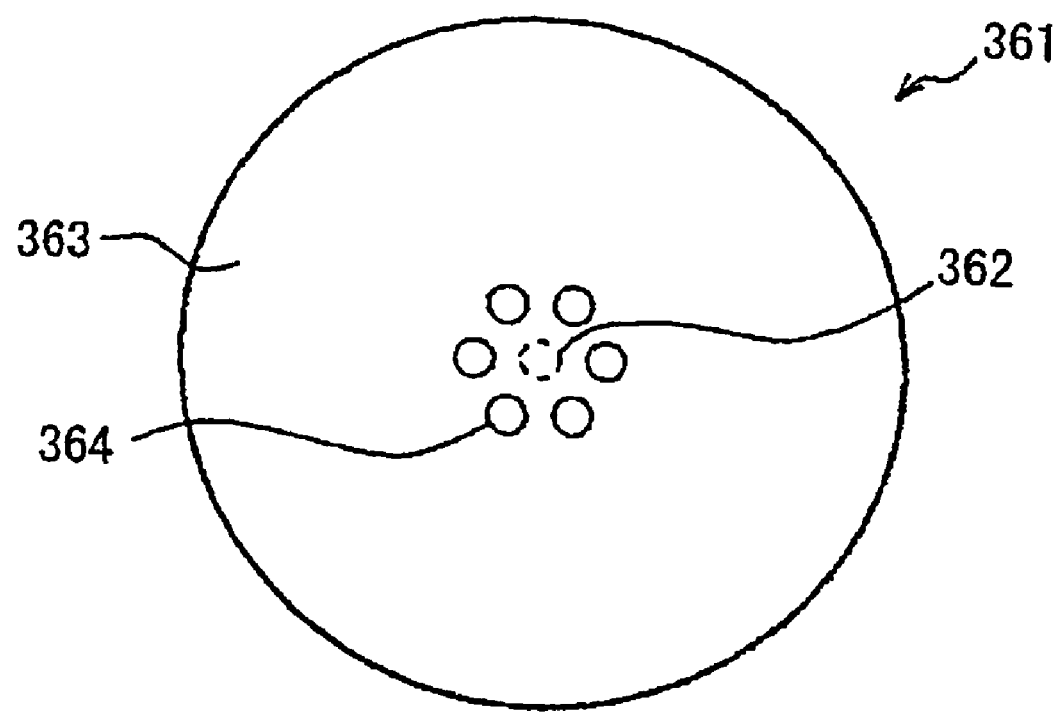
FIG. 17 is a transverse cross-sectional view illustrating one example of a Holey fiber.
Figure 18:
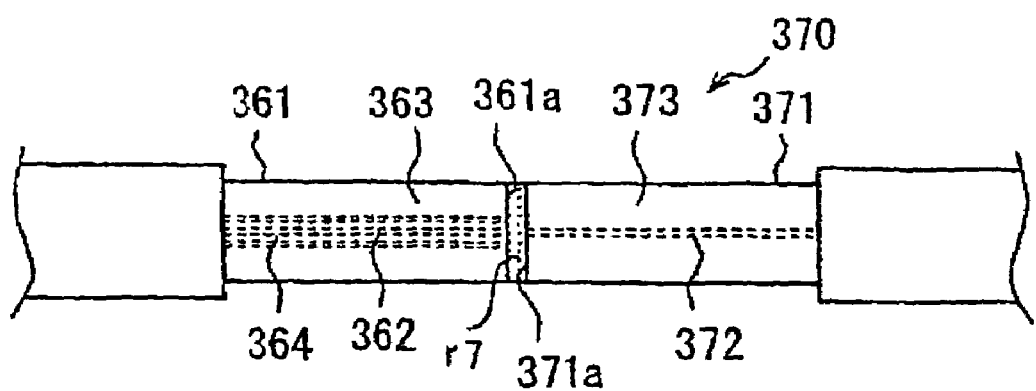
FIG. 18 is a side view illustrating a conventional optical fiber connection portion.

As illustrated in FIG. 12, the optical fiber connection portion 301 according to this embodiment uses the same Holey fiber (HF) 361 and single mode fiber (SMF) 371 as those explained in FIGS. 17 and 18. A coating-stripped and end-treated end face 361a of the HF 361 is joined to a coating-stripped and end-treated end face 371a of the SMF 371 via a refractive index matching agent r whose refractive index at a minimum temperature of −30° C. in practical use is lower than that of the respective cores 362 and 372 of the HF 361 and the SMF 371.

Because an air layer can be formed between respective end faces 361a and 372a of the HF 361 and the SMF 371 due to error in end treatment after end-to-end joining, the refractive index matching agent r is used to reduce a Fresnel reflection loss due to a refractive index difference caused by this air layer.

The refractive index matching agent r is made of high-molecular-polymer- or silicon based UV-curable resin, for example. The refractive index matching agent r used has an optical refractive index of not more than 1.458 in a 1.3-1.55 μm wavelength band at a minimum temperature of −30° C., and an average refractive index temperature coefficient of not less than −8.0×10⁻⁴/° C. and less than 0/° C. in a temperature range of −30° C. to +70° C., for example.

Here, the average refractive index temperature coefficient refers to a change amount of refractive index per 1° C. within a certain temperature range.

Figure 13:
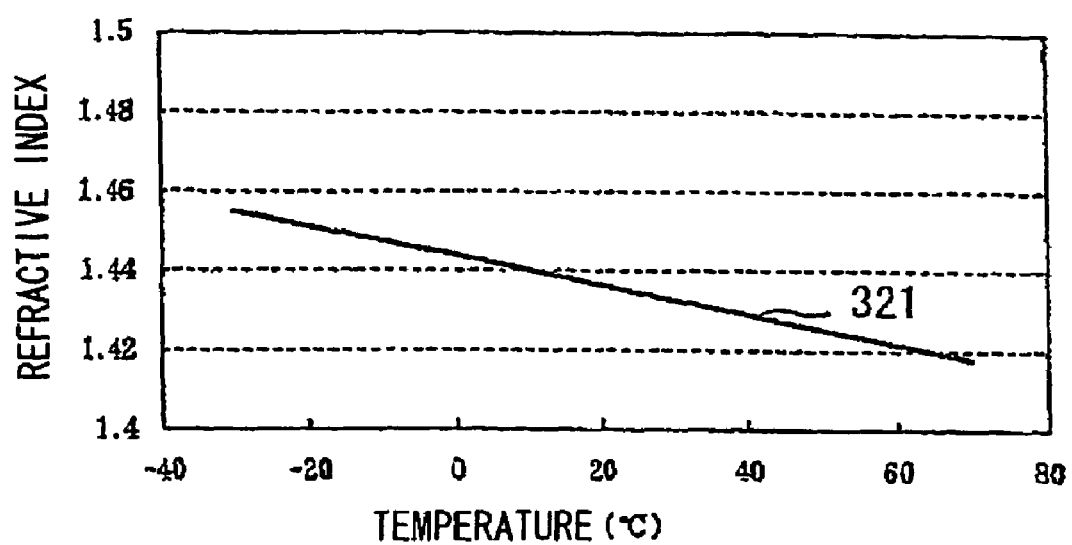
FIG. 13 shows the refractive index-temperature characteristics for a refractive index matching agent r illustrated in FIG. 12.

In this embodiment, there is used a gelled silicon-based refractive index matching agent r having the temperature property obeying a temperature characteristic line 321, as shown in FIG. 13 (horizontal axis: temperature [° C.]; vertical axis: refractive index). In more details, the temperature characteristic line 321 has a refractive index of 1.455 at −30° C., a refractive index of 1.435 at 20° C., a refractive index of 1.417 at 70° C., and an average refractive index temperature coefficient of approximately −4.0×10⁻⁴/° C. in a temperature range of −30° C. to +70° C.

A refractive index matching agent r with an optical refractive index of not more than 1.458 in a 1.3-1.55 μm wavelength band at a temperature of −30° C. is used to prevent a quasi-core from being formed by a refractive index matching agent r invading into the air holes 364 of the connected HF 361 and thereby prevent the widening of the effective MFD of the connected HF 361.

The reason for limiting the value range as above is as follows: Generally, the high-molecular-polymer-based refractive index matching agent r is used, whose refractive index tends to decrease with increasing temperature. The minimum temperature in practical use is −30° C., and if the refractive index at −30° C. of a refractive index matching agent r is equal to or less than that of the cladding 363, no quasi-core is formed in a temperature range above −30° C. The cladding of the most common quartz optical fiber is pure quartz, so that taking account 1.5 of its refractive index 1.458, the optical refractive index at a temperature of −30° C. is not more than 1.458. Generally, the wavelength of light transmitted through the quartz optical fiber is also 1.3-1.55 μm.

A refractive index matching agent r with an average refractive index temperature coefficient of not less than −8.0×10⁻⁴/° C. and less than 0/° C. in a temperature range of −30° C. to +70° C. is used to reduce a reflection attenuation amount in the connection portion in a high-temperature range.

The reason for limiting the value range as above is as follows: The highest temperature in practical use is +70° C., which pauses concern for degradation of reflection property in the connection portion due to a refractive index drop in a refractive index matching agent r in such a high-temperature range. Accordingly, the limit on the reflection attenuation amount in practical use is not less than 30 dBm. Here, the reflection attenuation amount depends on a refractive index difference between the core 362 and a refractive index matching agent r. According to Fresnel reflection formula, the reflection attenuation amount Lr is obtained by the following equation:

Reflection attenuation amount: $Lr = -10 \times \log R$ [dBm]

$R = (n1-n2)^2/(n1+n2)^2$, where n1 is the refractive index of the core 362 and n2 is the refractive index of a refractive index matching agent r.

From this equation, it is seen that when the refractive index of the core 362 is 1.463, in order to ensure a reflection attenuation amount of not less than 30 dBm, the refractive index of a refractive index matching agent r has to be not less than 1.39. The temperature difference between −30° C. and +70° C. is 100° C., and the average temperature coefficient required for a refractive index matching agent r is not less than −8.0×10$^{-4}$/° C. and less than 0/° C.

The operation of this embodiment is explained.

In the optical fiber connection portion 301, the end-to-end joining of the HF 361 to the SMF 371 through the refractive index matching agent r causes a capillary phenomenon that the refractive index matching agent r penetrates into each air hole 364 of the HF 361 up to the depth of a few hundreds μm from the end face 361a.

Here, as indicated by the temperature characteristic line 321 of FIG. 13, the refractive index of the refractive index matching agent r decreases gradually with increasing temperature, and is 1.455 at a minimum temperature of −30° C. in practical use, and 1.417 at a maximum temperature of +70° C. in practical use.

Accordingly, since the refractive index of the refractive index matching agent r is always lower than the refractive index of the core 362 of the HF 361 (the cladding 363, in this embodiment) in a temperature range of not less than −30° C., even in case of penetration of the refractive index matching agent r into each air hole 364, no quasi-core is formed around the original central core 362.

For this reason, in the optical fiber connection portion 301, the effective core diameter of the connected HF 361, i.e., the mode field diameter (MFD) is not varied before/after the connection, which therefore results in a small connection loss of the HF 361 and the SMF 371.

Although the above embodiment has been explained by way of the example of connecting the HF 361 and the SMF 371, HFs 361 may be connected to each other. Also, instead of the HF 361 in which the refractive index of the core 362 is higher than that of the cladding 363, there may be used an HF in which the refractive indices of the core 362 and the cladding 363 are equal to each other. In these cases, the same operation and effect as described above are also obtained.

Figure 16:
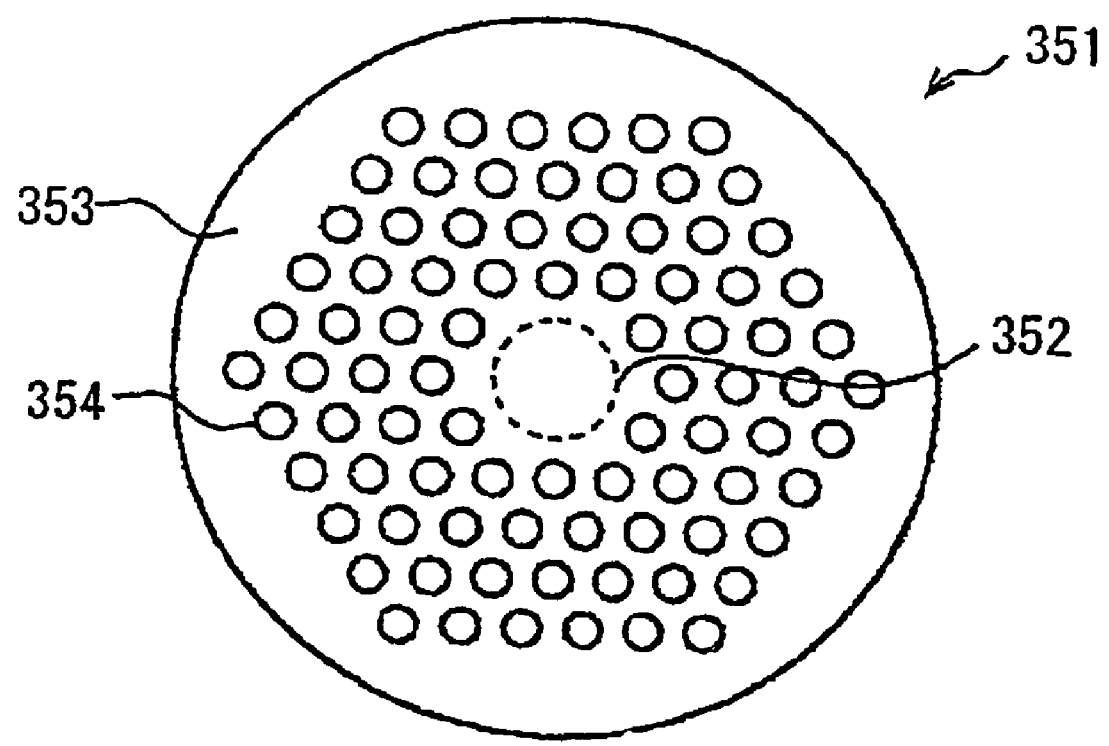
FIG. 16 is a transverse cross-sectional view illustrating one example of a photonic crystal fiber.

Further, instead of the HF 361, there may be used a photonic crystal fiber (PCF) 351 as illustrated in FIG. 16, which would yield the same operation and effect as described above. The PCF 351 comprises a core 352, a cladding 353 formed therearound, and a plurality of honeycombed air holes 354 extending in the axial direction of the core 352 so as to surround the core 352 in the cladding 353, which forms a diffraction grating with a photonic bandgap structure.

The optical fiber connection portion 301 according to this embodiment is not limited in the number of the air holes of the HF and PCF used and air-hole distribution diameters distributed in the cladding.

Next, there will be explained one example of an end-to-end joining type optical fiber splicer with the optical fiber connection portion 301 housed therein.

Figure 14:
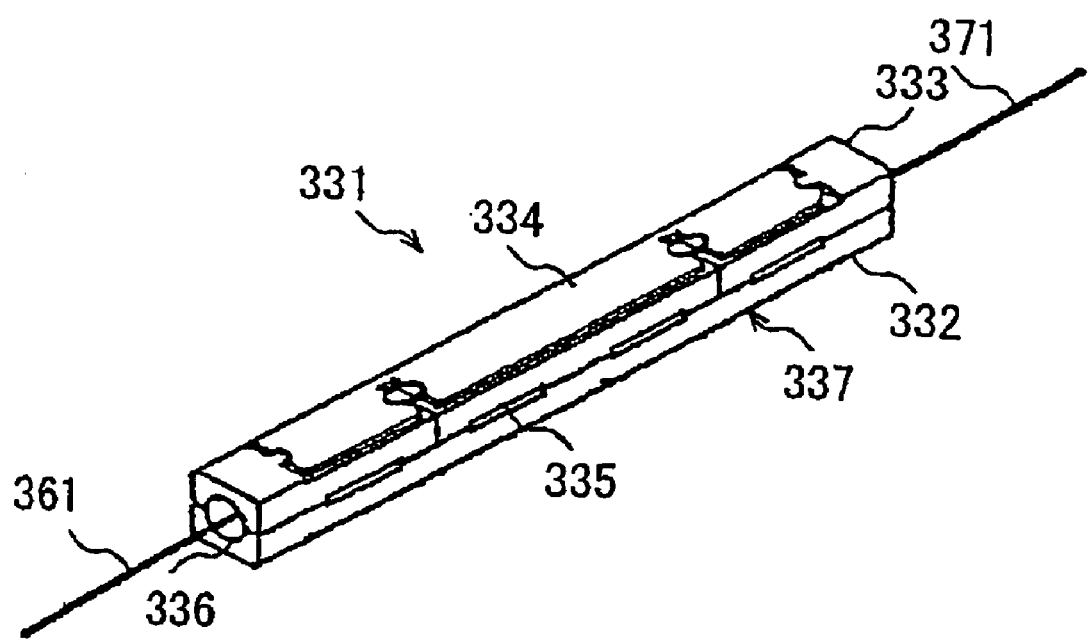
FIG. 14 is a perspective view illustrating an optical fiber splicer according to a sixth embodiment of the invention.

FIG. 14 is a perspective view illustrating an optical fiber splicer according to a sixth embodiment of the invention.

Figure 20:
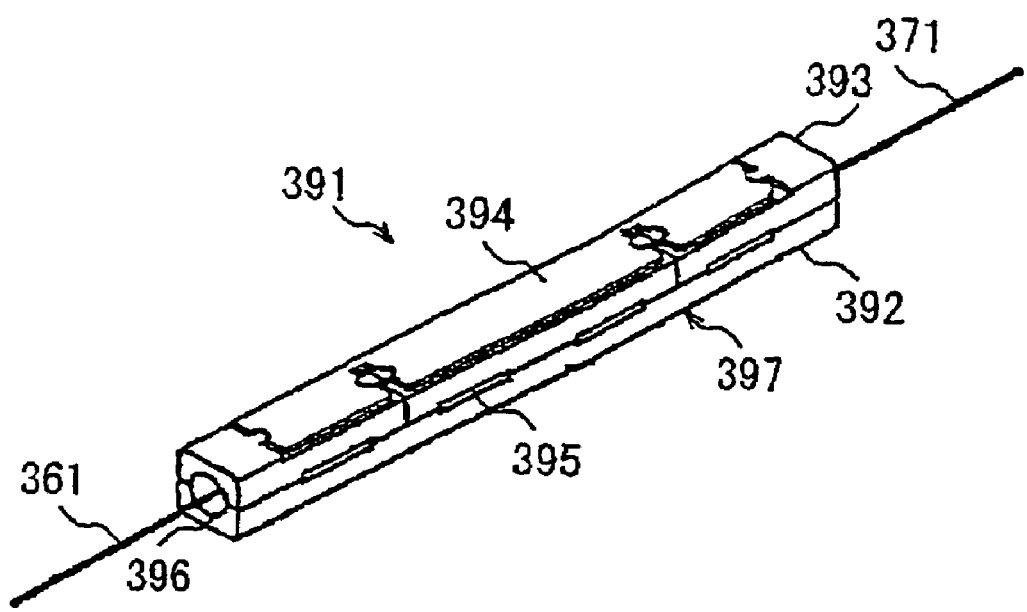
FIG. 20 is a perspective view illustrating one example of a conventional optical fiber splicer.
Figure 21:
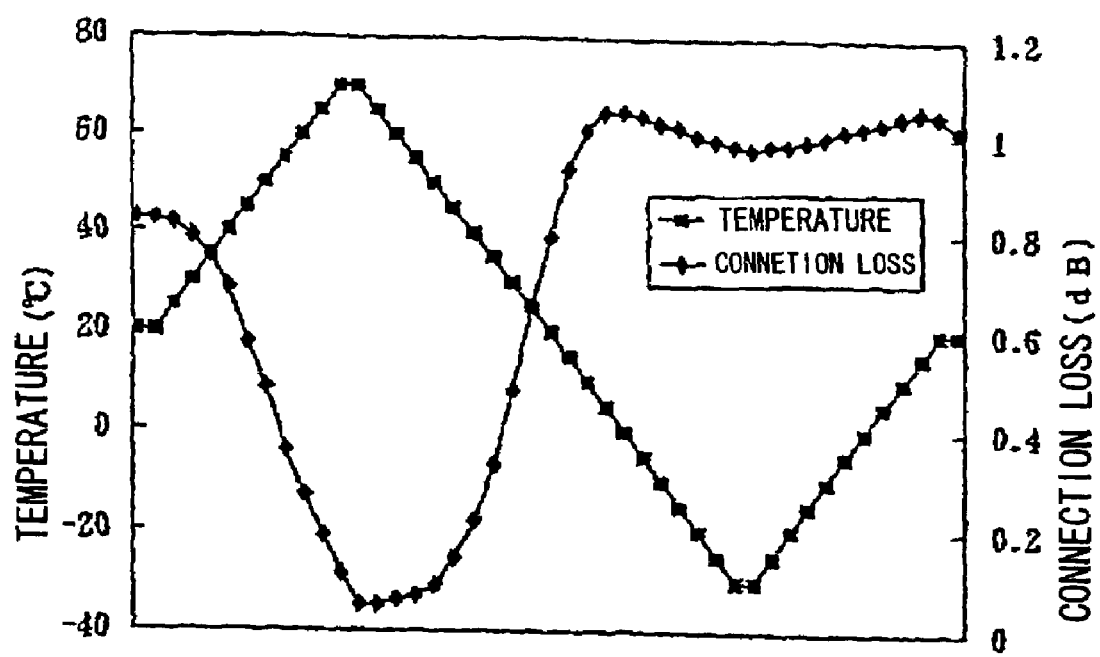
FIG. 21 shows the temperature characteristic of the connection loss for the optical fiber splicer illustrated in FIG. 20.

As illustrated in FIG. 14, a single-core mechanical splice 331 according to this embodiment has the same structure as that of the mechanical splice 391 explained in FIG. 20, except that there is used a refractive index matching agent r explained in FIGS. 12 and 13.

Namely, the mechanical splice 331 comprises a V-groove substrate 332 having a V-groove for end-to-end joining, supporting, positioning and core alignment of optical fibers facing each other; a lid 333 for being superimposed on the substrate 332 to hold the optical fibers inserted into the V-groove; and sandwiching members 334 for sandwiching the substrate 332 and the lid 333 therebetween.

In superimposed portions of the substrate 332 and the lid 333, wedge-inserting portions 335 are formed at their side, and guild holes 336 are formed at both their ends respectively. A chassis 337 comprises the substrate 332 and the lid 333.

In the mechanical splice 331, an end-to-end joining position of the optical fibers (an inner-surface middle portion of the substrate 332 and the lid 333) is beforehand filled with a refractive index matching agent r explained in FIGS. 12 and 13. With the substrate 332 and the lid 333 sandwiched by the sandwiching members 334, wedges are respectively inserted into the wedge-inserting portions 335 so as to form a gap between the substrate 332 and the lid 333, to insert the end-treated HF 361 and SMF 371 from the guild holes 336 into this gap for end-to-end joining thereof in the V-groove, followed by removal of the wedges to hold, fix and connect the HF 361 and SMF 371 by means of the substrate 332 and the lid 333.

This allows the optical fiber connection portion 301 explained in FIG. 12 to be housed in the chassis 337 of the mechanical splice 331, thereby joining end-to-end the HF 361 and SMF 371.

Unlike optical fiber splicers using a permanent joining method by adhesive and fusion bonding, this mechanical splice 331 is repeatedly usable. The connection loss of the mechanical splice 331 is approximately 0.08 dB at around room temperature and a wavelength of 1.55 μm.

Figure 15:
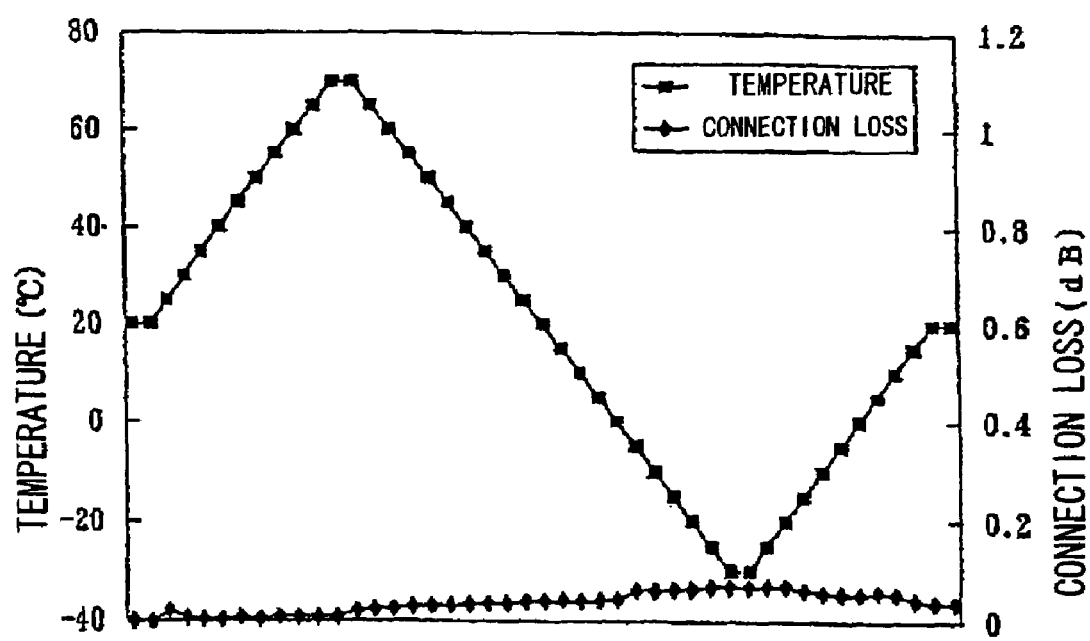
FIG. 15 shows the temperature characteristic of the connection loss for the optical fiber splicer illustrated in FIG. 14.

Here, shown in FIG. 15 is a temperature characteristic of connection loss in a temperature range of −30° C. to +70° C. in the mechanical splice 331 after connection. In FIG. 15 (horizontal axis: time; left vertical axis: temperature [° C.]; right vertical axis: connection loss [dB]), the temperatures varied by 5° C. every a predetermined time are indicated by black square plots, and the connection losses at those time points are indicated by black rhombus plots.

As shown in FIG. 15, the connection losses of the mechanical splice 331 after connection are stably less than 0.1 dB in all the temperature range. In case of use of a refractive index matching agent r with such a low refractive index, there would be concern for the magnitude of a reflection attenuation amount in the connection portion when there is a further drop of the refractive index of the refractive index matching agent r in a high-temperature range. However, the reflection attenuation amount at +70° C. of the mechanical splice 331 is 37 dBm, which satisfies a limit of not less than 30 dBm on the reflection attenuation amount in practical use.

In this manner, since the mechanical splice 331 is beforehand filled with the refractive index matching agent r, the HF 361 and SMF 371 can be connected with a low loss. The connection losses are the same as the connection losses of typical SMFs.

Since the mechanical splice 331 is also beforehand filled with the refractive index matching agent r, the temperature characteristic of the connection loss after connection is stabilized. The variation width of the connection loss is the same as the variation width of the connection loss of typical SMFs. In other words, the mechanical splice 331 has the small temperature characteristic variation of the connection loss, and particularly the low connection loss even in the low-temperature range.

Although the above embodiment has been explained by way of the example of connecting the HF 361 and the SMF 371 using the mechanical splice 331, HFs 361, PCF 351 and SMF 361, or PCFs 351 may be connected to each other using the mechanical splice 331. In these cases, the same operation and effect as described above are also obtained.

Although the example of using the V-groove mechanical splice 331 has been explained as the end-to-end joining type optical fiber splicer, there may be used any end-to-end joining type of optical fiber splicer such as other V-groove splicers, capillary splicers, etc.

Further, there may, other than these repeatedly usable optical fiber splicers, be used optical fiber splicers using a permanent joining method in which an epoxy-based UV-curable adhesive also serves as a refractive index matching agent r.

An optical fiber connection portion and optical fiber splicer according to a seventh embodiment of the invention will be explained below referring to the drawings.

Figure 19:
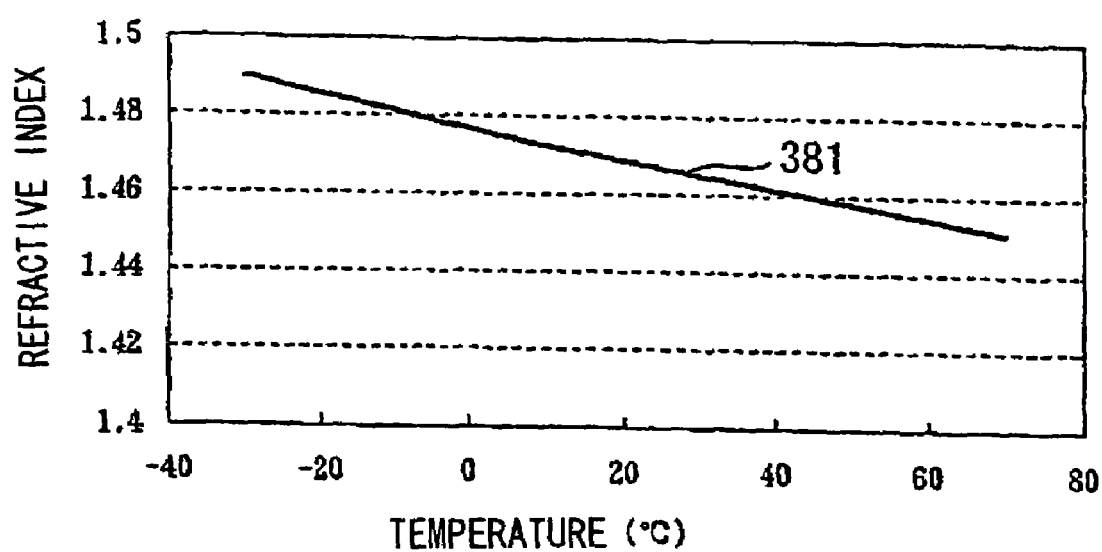
FIG. 19 shows the refractive index-temperature characteristics for a refractive index matching agent r7 illustrated in FIG. 18.

First, as a method for overcoming the problem of a large temperature characteristic variation of the connection loss in the above-described mechanical splice 391, the present inventors use a low refractive index matching agent whose refractive index is lower than that of the refractive index matching agent r7 of FIGS. 18 and 19, and which obeys the temperature characteristic line 321 as shown in FIG. 13. This refractive index matching agent has a refractive index of 1.455 at −30° C., a refractive index of 1.435 at 20° C., a refractive index of 1.417 at 70° C., and an average refractive index temperature coefficient of approximately $-4.0\times10^{-4}$/° C. in a temperature range of −30° C. to +70° C.

In the mechanical splice 391 illustrated in FIG. 20, in the case of use of the low refractive index matching agent instead of the refractive index matching agent r7, the connection loss at a wavelength of 1.55 μm is 0.08 dB under the environment of 20° C., as shown in FIG. 15. Also, the connection loss in a temperature range of −30° C. to +70° C. of the mechanical splice 391 after connection is stably less than 0.1 dB. However, in case of use of such a low refractive index matching agent, there would be concern for the magnitude of a reflection amount in the connection portion of the HF 361 and SMF 371 when there is a further drop of the refractive index of the low refractive index matching agent in a high-temperature range.

Figure 25:
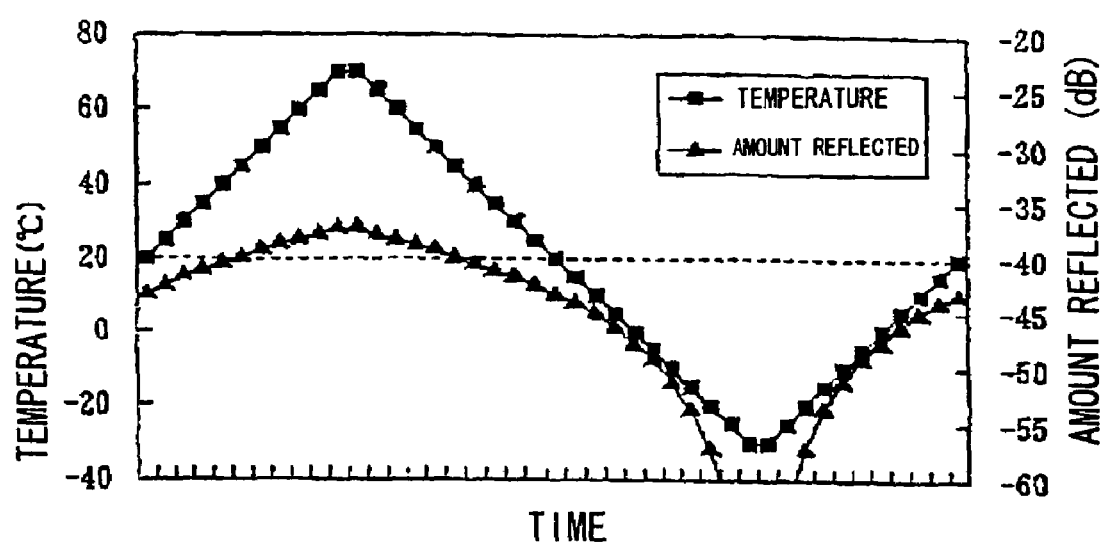
FIG. 25 shows the temperature characteristic of the amount reflected, in the case of use of the low refractive index matching agent having the characteristics shown in FIG. 13.

FIG. 25 shows the temperature characteristic of the amount reflected in the mechanical splice 391, in the case of use of the low refractive index matching agent. When the relative refractive index difference of the core to the cladding is substantially 0.35%, the refractive indices of the respective cores 362 and 372 of the HF 361 and SMF 371 are both 1.463, but as shown in FIG. 25, in the case of 70° C., for example, the amount reflected in that case is −36 dB, which does not fully satisfy not more than −40 dB required in practical use.

Accordingly, the present inventors use an optical fiber connection portion and optical fiber splicer capable of making both the connection loss and reflected amount small.

A seventh embodiment of the invention will be explained below referring to the drawings.

Figure 22:
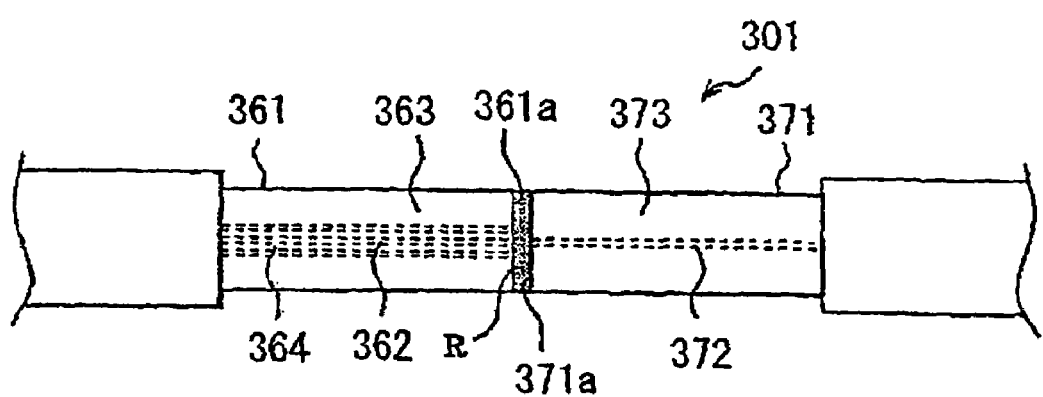
FIG. 22 is a side view illustrating an optical fiber connection portion according to a seventh embodiment of the invention.

FIG. 22 is a side view illustrating an optical fiber connection portion according to the seventh embodiment of the invention.

As illustrated in FIG. 22, the optical fiber connection portion 301 according to this embodiment uses the same Holey fiber (HF) 361 and single mode fiber (SMF) 371 as those explained in FIGS. 17 and 18. A coating-stripped and end-treated end face 361a of the HF 361 is joined to a coating-stripped and end-treated end face 371a of the SMF 371 via a refractive index matching mixture R whose refractive index in a temperature range of −30° C. to +70° C. in practical use is not more than that of respective claddings 363 and 373 of the HF 361 and the SMF 371, and which contains micro-bodies with an average diameter or length of not more than 100 nm.

Because an air layer can be formed between respective end faces 361a and 372a of the HF 361 and the SMF 371 due to error in end treatment after end-to-end joining, the refractive index matching mixture R is used to reduce a Fresnel reflection loss due to a refractive index difference caused by this air layer.

The refractive index matching mixture R is made of, for example, a high-molecular-polymer- or silicon based refractive index matching agent or UV-curable resin into which, as micro-bodies, are mixed fine particles (nano-powder) with an average diameter of not more than 100 nm, or thin flat ribbon bodies, tube bodies, or fiber bodies with an average length of not more than 100 μm. In this embodiment, as the refractive index matching mixture R, there is used a high-molecular-polymer-based refractive index matching mixture into which is mixed nano-powder consisting mainly of pure quartz.

The weight ratio of mixing the refractive index matching agent and the micro-bodies is 10:1 to 1:1, for example.

The refractive index of the refractive index matching mixture R in a temperature range of −30° C. to +70° C. is made not more than that of the respective claddings 363 and 373 of the HF 361 and the SMF 371, to prevent a quasi-core from being formed adjacent to the end face 361a by the refractive index matching mixture R invading from the end face 361a of the HF 361 into the air holes 364, and thereby prevent the occurrence of optical coupling phenomena from the original cores, i.e., the respective cores 363 and 373 of the HF 361 and the SMF 371.

Generally, as the refractive index matching agent, a high-molecular-polymer-based refractive index matching agent is used, whose refractive index tends to decrease with increasing temperature. The minimum temperature in practical use is −30° C., and if the refractive index at −30° C. of the refractive index matching agent is not more than that of the claddings 363 and 373, no quasi-core is formed adjacent to the end face 361a in a temperature range above −30° C., and even at the maximum temperature of +70° C. in practical use.

The refractive index matching mixture R containing micro-bodies with an average diameter or length of not more than 100 nm is used to prevent light scattering. In case of the average diameter or length of micro-bodies exceeding 100 nm, when the HF 361 and the SMF 371 are joined together end-to-end, the optical axis between the HF 361 and the SMF 371 is misaligned so as to induce a connection loss due to the axial misalignment.

The nanopowder consisting mainly of pure quartz is used as the micro-bodies, because pure quartz has substantially the same refractive index as the respective claddings 363 and 373 of the HF 361 and the SMF 371, so that the refractive index-temperature characteristics of the nanopowder consisting mainly of pure quartz is substantially at a constant level almost without varying in a temperature range of −30° C. to +70° C. Therefore, by allowing the high-molecular-polymer-based refractive index matching agent that is the base material to contain the nanopowder consisting mainly of pure quartz, the refractive index-temperature characteristic variation of the refractive index matching mixture R can be relaxed.

The weight ratio of mixing the refractive index matching agent and the micro-bodies is 10:1 to 1:1, which is because the mixing weight ratio of less than 10:1 has a practically insignificantly less effect on relaxing the refractive index-temperature characteristic variation of the micro-body-containing refractive index matching mixture R, and also which is because the mixing weight ratio of exceeding 1:1 makes the viscosity of the refractive index matching mixture R high, which causes difficulty in coating and mounting to the connection portion of the HF 361 and the SMF 371.

There will be explained one example of the refractive index matching mixture R next.

Nanopowder (fine $SiO_2$ particles with a particle size of 37 nm, made by Hosokawa Micron Ltd.) is mixed into a high-molecular-polymer-based refractive index matching agent whose refractive index at −30° C. is 1.458 so that the weight ratio of mixing the high-molecular-polymer-based refractive index matching agent and the nanopowder is 10:5, to prepare a refractive index matching mixture R.

Figure 23:
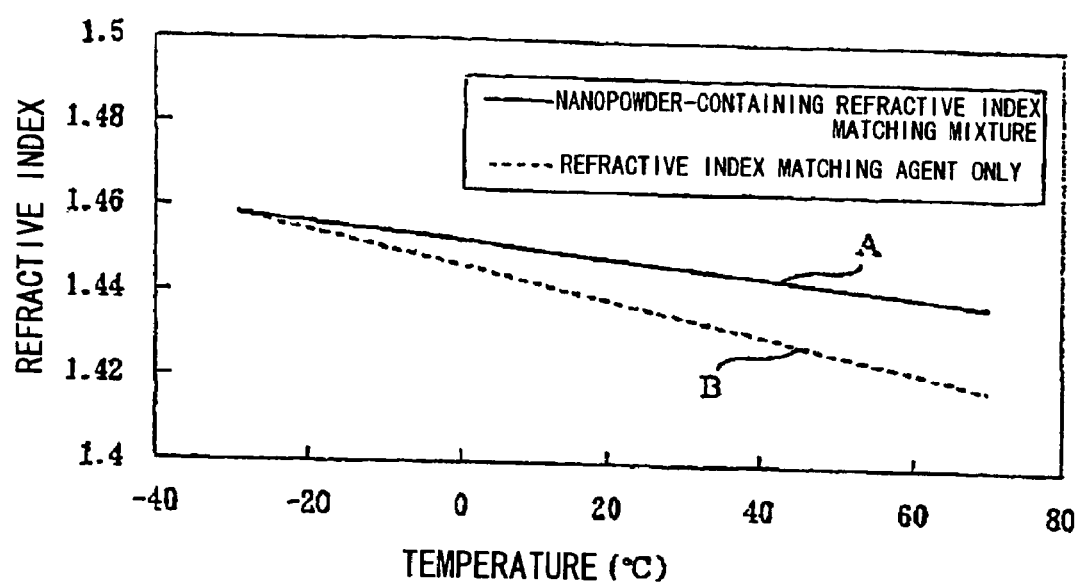
FIG. 23 shows the refractive index-temperature characteristics A for a refractive index matching mixture R illustrated in FIG. 22.

As illustrated in FIG. 23 (horizontal axis: temperature [° C.]; vertical axis: refractive index), the high-molecular-polymer-based refractive index matching agent has a temperature characteristic which obeys a temperature characteristic line B indicated by a dotted line. The temperature characteristic line B has a refractive index of 1.458 at −30° C., a refractive index of approximately 1.42 at +70° C., and an average refractive index temperature coefficient of approximately $-4.0 \times 10^{-4}$/° C. in a temperature range of −30° C. to +70° C. Here, the average refractive index temperature coefficient refers to a change amount of refractive index per 1° C. within a certain temperature range.

The refractive index matching mixture R has a temperature characteristic which obeys a temperature characteristic line A indicated by a dotted line. The temperature characteristic line A has a refractive index of 1.458 at −30° C., a refractive index of approximately 1.44 at +70° C., and an average refractive index temperature coefficient of approximately $-2.0 \times 10^{-4}$/° C. in a temperature range of −30° C. to +70° C. Since the refractive index matching mixture R contains the nanopowder, it can relax its refractive index-temperature characteristic variation, and have half the average refractive index temperature coefficient, compared to the high-molecular-polymer-based refractive index matching agent containing no nanopowder.

The functions of this embodiment are explained below.

In the optical fiber connection portion 301, the end-to-end joining of the HF 361 to the SMF 371 via the refractive index matching mixture R causes a capillary phenomenon whereby the refractive index matching mixture R penetrates into each air hole 364 of the HF 361 up to the depth of a few hundreds μm from the end face 361*a*.

Here, as indicated by the temperature characteristic line A of FIG. 23, the refractive index of the refractive index matching mixture R decreases gradually with increasing temperature, and is 1.458 at a minimum temperature of −30° C. in practical use, and 1.44 at a maximum temperature of +70° C. in practical use.

Accordingly, since the refractive index of the refractive index matching mixture R is lower than the refractive index of the cladding 363 of the HF 361 in a temperature range of not less than −30° C., even in case of penetration of the refractive index matching mixture R into each air hole 364, no quasi-core is formed around the original central core 362.

For this reason, in the optical fiber connection portion 301, in a temperature range of −30° C. to +70° C. in practical use, optical coupling phenomena can be prevented from occurring from the original cores, i.e., the respective cores 363 and 373 of the HF 361 and the SMF 371. In other words, the effective core diameter of the connected HF 361, i.e., the mode field diameter (MFD) is not varied before/after the connection, which therefore results in a small connection loss of the HF 361 and the SMF 371. Accordingly, the HF 361 and SMF 371 can be connected with a low loss.

Also, in the optical fiber connection portion 301, since the refractive index matching mixture R contains the nanopowder consisting mainly of pure quartz which causes almost no refractive index-temperature characteristic variation, the refractive index matching mixture R can relax its refractive index-temperature characteristic variation in the temperature range in practical use, and suppress light reflection at the respective end faces 361*a* and 372*a* of the HF 361 and the SMF 371, which therefore results in a small reflection amount. Accordingly, the HF 361 and SMF 371 can be connected with low reflection.

Although the above embodiment has been explained by way of the example of connecting the HF 361 and the SMF 371, HFs 361 may be connected to each other. Also, instead of the HF 361 in which the refractive index of the core 362 is higher than that of the cladding 363, there may be used an HF in which the refractive indices of the core 362 and the cladding 363 are equal to each other. Also in these cases, the same functions and effects as described above can be obtained.

Further, instead of the HF 361, there may be used a photonic crystal fiber (PCF) 351 as illustrated in FIG. 16, which would yield the same operation and effect as described above. The PCF 351 comprises a core 352, a cladding 353 formed therearound, and a plurality of honeycombed air holes 354 extending in the axial direction of the core 352 so as to surround the core 352 in the cladding 353, which forms a diffraction grating with a photonic bandgap structure.

The optical fiber connection portion 301 according to this embodiment is not limited in the number of the air holes of the HF and PCF used and air-hole distribution diameters distributed in the cladding.

Next, there will be explained one example of an end-to-end joining type optical fiber splicer with the optical fiber connection portion 301 housed therein.

As illustrated in FIG. 14, a single-core mechanical splice 331 according to this embodiment has the same structure as that of the mechanical splice 391 explained in FIG. 20, except that there is used a refractive index matching mixture R explained in FIGS. 22 and 23.

Namely, the mechanical splice 331 comprises a V-groove substrate 332 having a V-groove for end-to-end joining, supporting, positioning and core alignment of optical fibers facing each other; a lid 333 for being superimposed on the substrate 332 to hold the optical fibers inserted into the V-groove; and sandwiching members 334 for sandwiching the substrate 332 and the lid 333 therebetween.

In superimposed portions of the substrate 332 and the lid 333, wedge-inserting portions 335 are formed at their side, and guild holes 336 are formed at both their ends respectively. A chassis 337 comprises the substrate 332 and the lid 333.

In the mechanical splice 331, an end-to-end joining position of the optical fibers (an inner-surface middle portion of the substrate 332 and the lid 333) is beforehand filled with a refractive index matching mixture R explained in FIGS. 22 and 23. With the substrate 332 and the lid 333 sandwiched by the sandwiching members 334, wedges are respectively inserted into the wedge-inserting portions 335 so as to form a gap between the substrate 332 and the lid 333, to insert the end-treated HF 361 and SMF 371 from the guild holes 336 into this gap for end-to-end joining thereof in the V-groove, followed by removal of the wedges to hold, fix and connect the HF 361 and SMF 371 by means of the substrate 332 and the lid 333.

This allows the optical fiber connection portion 301 explained in FIG. 22 to be housed in the chassis 337 of the mechanical splice 331, thereby joining end-to-end the HF 361 and SMF 371.

Unlike optical fiber splicers using a permanent joining method by adhesive and fusion bonding, this mechanical splice 331 is repeatedly usable. The connection loss of the mechanical splice 331 is approximately 0.08 dB at around room temperature and a wavelength of 1.55 μm.

Figure 24:
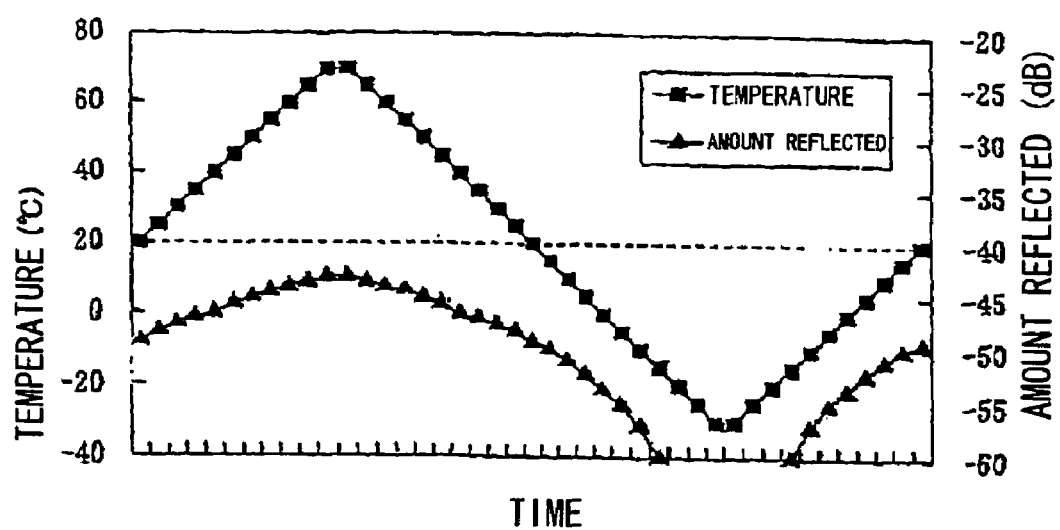
FIG. 24 shows the temperature characteristic of the amount reflected, regarding an optical fiber splicer with the optical fiber connection portion according to the seventh embodiment.

FIG. 24 shows the temperature characteristic of the amount reflected in a temperature range of −30° C. to +70° C. in the mechanical splice 331 after connection. In FIG. 24 (horizontal axis: time; left vertical axis: temperature [° C.]; right vertical axis: amount reflected [dB]), the temperatures varied by 5° C. every a predetermined time are indicated by black square plots, and the amounts reflected at those time points are indicated by black triangle plots.

As shown in FIG. 24, the amounts reflected of the mechanical splice 331 after connection are stably less than −41 dB (practically sufficiently less than −40 dB) in all the temperature range. Although not illustrated, the connection loss at a wavelength of 1.55 μm is also stably less than 0.1 dB in all the temperature range.

In this manner, since the mechanical splice 331 is beforehand filled with the refractive index matching mixture R, the HF 361 and SMF 371 can be connected with a low loss and low reflection. The connection losses are the same as the connection losses of typical SMFs.

Since the mechanical splice 331 is also filled beforehand with the refractive index matching mixture R, the temperature characteristics of the connection loss and reflection amount after connection are stabilized. The variation width of the connection loss is the same as the variation width of the connection loss of typical SMFs. In other words, the mechanical splice 331 has the small temperature characteristic variations of the connection loss and reflection amount, and particularly the low connection loss and low reflection amount even in the low-temperature range.

Although the above embodiment has been explained by way of the example of connecting the HF 361 and the SMF 371 using the mechanical splice 331, HFs 361, PCF 351 and SMF 371, or PCFs 351 may be connected to each other using the mechanical splice 331. Also in these cases, the same functions and effects as described above can be obtained.

Although the example of using the V-groove mechanical splice 331 has been explained as the end-to-end joining type optical fiber splicer, there may be used any end-to-end joining type of optical fiber splicer such as other V-groove splicers, capillary splicers, etc.

Further, there may, other than these repeatedly usable optical fiber splicers, be used optical fiber splicers using a permanent joining method in which an epoxy-based UV-curable adhesive also serves as a refractive index matching mixture R.

This invention is not limited to any of the above-described embodiments, but may embody various modifications in scope that may occur to one skilled in the art without any departure from the scope of the appended claims.

The invention claimed is:

1. A connection portion of an optical fiber, comprising:
a refractive index matching agent for joining an optical fiber end-to-end with another optical fiber, the optical fiber including a core and a cladding comprising a plurality of air holes around the core, the refractive index matching agent having a refractive index at a minimum temperature in practical use less than a refraction index of said core,
wherein said refractive index matching agent has an optical refractive index of 1.458 or less in a 1.3 μm to 1.55 μm wavelength band at a temperature of −30° C., an average refractive index temperature coefficient of −8.0× $10^{-4}$/° C. or greater, and a refractive index temperature of less than 0° C. in a temperature range of −30° C. to +70° C.

2. A connection portion of an optical fiber, comprising:
a refractive index matching agent for joining an optical fiber end-to-end with another optical fiber, the optical fiber including a core and a cladding comprising a plurality of air holes around the core, the refractive index matching agent having a refractive index at a minimum temperature in practical use less than a refractive index of said cladding,
wherein said refractive index matching agent has an optical refractive index of 1.458 or less in a 1.3 μm to 1.55 μm wavelength band at a temperature of −30° C., an average refractive index temperature coefficient of −8.0× $10^{-4}$/° C. or greater, and a refractive index temperature of less than 0° C. in a temperature range of −30° C. to +70° C.

3. An optical fiber splicer, wherein said connection portion of the optical fiber is as defined in claim 1 housed in a chassis.

4. An optical fiber splicer, wherein said connection portion of the optical fiber is as defined in claim 2 housed in a chassis.

5. A connection portion of an optical fiber, comprising:
a refractive index matching mixture for joining an optical fiber end-to-end with another optical fiber, the optical fiber including a core and a cladding comprising a plurality of air holes around the core, the refractive index matching mixture having a refractive index in a temperature range in practical use less than a refractive index of said cladding,
wherein said optical fiber comprises a micro-body with an average diameter or length of 100 nm or less.

6. The connection portion of the optical fiber according to claim 5, wherein said micro-body comprises a fine particle comprising mainly pure quartz.

7. The connection portion of the optical fiber according to claim 5, wherein said refractive index matching mixture comprises a refractive index matching agent with said micro-body mixed therewith, and
wherein a mixture weight ratio of said refractive index matching agent and said micro-body is in a range from 10:1 to 1:1.

8. An optical fiber splicer, wherein said connection portion of the optical fiber is as defined in claim 5 housed in a chassis.

9. The connection portion of the optical fiber according to claim 1, wherein said refractive index matching agent is provided between an end of said optical fiber and an end of said another optical fiber.

10. The connection portion of the optical fiber according to claim 1, wherein said refractive index matching agent comprises at least one of silicon-based gel, high-molecular polymer and silicon-based UV-curable resin.

11. The connection portion of the optical fiber according to claim 2, wherein said refractive index matching agent is provided between an end of said optical fiber and an end of said another optical fiber.

12. The connection portion of the optical fiber according to claim 2, wherein said refractive index matching agent comprises at least one of silicon-based gel, high-molecular polymer and silicon-based UV-curable resin.

13. The connection portion of the optical fiber according to claim 7, wherein said refractive index matching agent is provided between an end of said optical fiber and an end of said another optical fiber.

14. The connection portion of the optical fiber according to claim 7, wherein said refractive index matching agent comprises at least one of silicon-based gel, high-molecular polymer, and silicon-based UV-curable resin.

15. The connection portion of the optical fiber according to claim 1, wherein said refractive index matching agent is provided such that said optical fiber has a mode-field diameter that is equal to a mode-field diameter of said another optical fiber.

16. The connection portion of the optical fiber according to claim 7, wherein said refractive index matching agent has an optical refractive index of 1.458 or less in a 1.3 μm to 1.55 μm wavelength band at a temperature of −30° C., an average refractive index temperature coefficient of −8.0×10$^{-4}$/° C. or greater, and a refractive index temperature of less than 0° C. in a temperature range of −30° C. to +70° C.

17. The connection portion of the optical fiber according to claim 1, wherein said optical fiber comprises a holey fiber with a mode field diameter that is constant before and after a connection of said optical fiber to said another optical fiber.

18. The connection portion of the optical fiber according to claim 1, wherein said optical fiber comprises a photonic crystal fiber with a mode field diameter that is constant before and after a connection of said optical fiber to said another optical fiber.

19. The connection portion of the optical fiber according to claim 5, wherein said optical fiber comprises a holey fiber with a mode field diameter that is constant before and after a connection of said optical fiber to said another optical fiber.

20. The connection portion of the optical fiber according to claim 5, wherein said optical fiber comprises a photonic crystal fiber with a mode field diameter that is constant before and after a connection of said optical fiber to said another optical fiber.

* * * * *